US009875059B2

(12) United States Patent
Nasu et al.

(10) Patent No.: US 9,875,059 B2
(45) Date of Patent: Jan. 23, 2018

(54) STORAGE SYSTEM

(71) Applicant: HITACHI, LTD., Tokyo (JP)

(72) Inventors: Hiroshi Nasu, Tokyo (JP); Nobuhiro Maki, Tokyo (JP); Hideo Saito, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/121,516

(22) PCT Filed: Apr. 21, 2014

(86) PCT No.: PCT/JP2014/061194
§ 371 (c)(1),
(2) Date: Aug. 25, 2016

(87) PCT Pub. No.: WO2015/162674
PCT Pub. Date: Oct. 29, 2015

(65) Prior Publication Data
US 2016/0364170 A1    Dec. 15, 2016

(51) Int. Cl.
*G06F 3/06* (2006.01)
*G06F 13/10* (2006.01)
*G06F 11/20* (2006.01)

(52) U.S. Cl.
CPC ............. *G06F 3/0647* (2013.01); *G06F 3/06* (2013.01); *G06F 3/0604* (2013.01); *G06F 3/0664* (2013.01); *G06F 3/0685* (2013.01); *G06F 13/10* (2013.01); *G06F 11/2094* (2013.01); *G06F 2201/805* (2013.01); *G06F 2201/82* (2013.01)

(58) Field of Classification Search
CPC .... G06F 3/0647; G06F 3/0685; G06F 3/0604; G06F 3/0664; G06F 3/06; G06F 13/10; G06F 2201/82; G06F 2201/805; G06F 11/2094
See application file for complete search history.

(56) References Cited

U.S. PATENT DOCUMENTS 6,976,103 B1    12/2005  Watanabe et al.
8,341,459 B2 *  12/2012  Kaushik ............... G06F 3/0617
                                                        709/232
9,720,991 B2 *   8/2017  Kritchko ........... G06F 17/30575
(Continued)

FOREIGN PATENT DOCUMENTS

JP    2001-249853 A    9/2001
JP    2007-102455 A    4/2007

Primary Examiner — Michael Alsip
(74) Attorney, Agent, or Firm — Volpe and Koenig, P.C.

(57) ABSTRACT

Provided is a control method for a plurality of storage apparatuses that perform a migration from a pre-migration volume group to a post-migration volume group. The plurality of storage apparatuses are configured to accept a write command directed to any one of a plurality of volumes in the pre-migration volume group and the post-migration volume group when the migration is being processed. The control method includes writing write data of the write command to all of the plurality of volumes in a predetermined order, writing the write data to a last volume last among the plurality of volumes, and writing the write data to volumes different from the last volume after individually obtaining exclusive locks and, after completion of the writing the write data to the last volume, releasing the exclusive locks.

9 Claims, 29 Drawing Sheets

(56) References Cited

U.S. PATENT DOCUMENTS

| | | |
|---|---|---|
| 2007/0079099 A1 | 4/2007 | Eguchi |
| 2008/0034005 A1 | 2/2008 | Satoyama et al. |
| 2009/0037679 A1* | 2/2009 | Kaushik ................ G06F 3/0617 711/162 |
| 2010/0257328 A1* | 10/2010 | Liu ....................... G06F 3/0617 711/162 |

* cited by examiner

RESOURCE MANAGEMENT TABLE 2310

| RESOURCE TYPE 2311 | RESOURCE ID 2312 | RESOURCE GROUP ID 2313 | VIRTUAL RESOURCE ID 2314 |
|---|---|---|---|
| VOLUME | VOL1 | RSG1 | VOL11 |
| HOST GROUP | HG1 | RSG1 | - |
| PORT | PT1 | RSG1 | - |
| ... | ... | ... | ... |

*Fig. 6A*

HOST GROUP MANAGEMENT TABLE 2380

| PORT ID 2381 | HOST GROUP ID 2382 | HOST MODE 2383 | HOST WWN 2384 | VOLUME ID 2385 |
|---|---|---|---|---|
| PT1 | HG1 | OS X | 10000060B0C07395 | VOL11 |
| ... | ... | ... | ... | ... |

*Fig. 6B*

VIRTUAL STORAGE BOX MANAGEMENT TABLE 2320

| VIRTUAL STORAGE BOX ID 2321 | RESOURCE GROUP ID 2322 |
|---|---|
| VBOX1 | RSG1 |
| ... | ... |

*Fig. 7*

VIRTUAL STORAGE MANAGEMENT TABLE 2330

| VIRTUAL STORAGE ID 2331 | VIRTUAL STORAGE BOX ID 2332 |
|---|---|
| ST1 | VBOX1 |
| ... | ... |

*Fig. 8*

VOLUME COPY PAIR MANAGEMENT TABLE 2340

| PAIR ID 2341 | PAIR TYPE 2342 | PAIR STATUS 2343 | PVOLID 2344 | SVOLID 2345 | ASSOCIATED PAIR ID 2346 | PRIORITY 2347 |
|---|---|---|---|---|---|---|
| PR1 | HA-MLT | PAIR | ST1.VOL1 | ST2.VOL2 | PR2 | FIRST |
| PR2 | HA-MLT | COPY | ST1.VOL1 | ST3.VOL3 | PR1 | SECOND |
| ... | ... | ... | ... | ... | ... | ... |

*Fig. 9A*

EXCLUSIVE LOCK MANAGEMENT TABLE 2390

| EXCLUSIVE LOCK ID 2391 | VOLUME ID 2392 | LBA 2393 |
|---|---|---|
| EL1 | VOL1 | xx-xx |
| ... | ... | ... |

*Fig. 9B*

| VIRTUAL STORAGE MANAGEMENT TABLE 4320 | |
|---|---|
| VIRTUAL STORAGE ID 4321 | VIRTUAL STORAGE BOX ID 4322 |
| ST1 | ST1.VBOX1 |
| ST1 | ST2.VBOX1 |
| ST1 | ST3.VBOX1 |
| ... | ... |

Fig. 11

| VIRTUAL STORAGE BOX MANAGEMENT TABLE 4330 | |
|---|---|
| VIRTUAL STORAGE BOX ID 4331 | RESOURCE GROUP ID 4332 |
| ST1.VBOX1 | RSG1 |
| ST2.VBOX1 | RSG1 |
| ST3.VBOX1 | RSG1 |
| ... | ... |

Fig. 12

VIRTUAL STORAGE RESOURCE MANAGEMENT TABLE 4340

| 4341 RESOURCE TYPE | 4342 RESOURCE ID | 4343 RESOURCE GROUP ID | 4344 VIRTUAL RESOURCE ID |
|---|---|---|---|
| VOLUME | ST1.VOL1 | ST1.RSG1 | VOL11 |
| HOST GROUP | ST1.HG1 | ST1.RSG1 | xxx |
| PORT | ST1.PT1 | ST1.RSG1 | xxx |
| VOLUME | ST2.VOL2 | ST2.RSG1 | VOL11 |
| HOST GROUP | ST2.HG1 | ST2.RSG1 | xxx |
| PORT | ST2.PT1 | ST2.RSG1 | xxx |
| VOLUME | ST3.VOL3 | ST3.RSG1 | VOL11 |
| HOST GROUP | ST3.HG1 | ST3.RSG1 | xxx |
| PORT | ST3.PT1 | ST3.RSG1 | xxx |
| ... | ... | ... | ... |

Fig. 13

VOLUME COPY PAIR MANAGEMENT TABLE 4350

| 4351 PAIR ID | 4352 PAIR TYPE | 4353 PAIR STATUS | 4354 PVOLID | 4355 SVOLID | 4356 ASSOCIATED PAIR ID | 4357 PRIORITY |
|---|---|---|---|---|---|---|
| PR1 | S-HA | PAIR | ST1.VOL1 | ST2.VOL2 | ST1.PR2 | FIRST |
| PR2 | S-HA | COPY | ST1.VOL1 | ST3.VOL3 | ST1.PR1 | SECOND |
| ... | ... | ... | ... | ... | ... | ... |

Fig. 14

STORAGE SYSTEM

BACKGROUND OF THE INVENTION

This invention relates to a storage system, and particularly, relates to migration of a volume group in a storage system.

The background art includes US 2008/0034005 A, which discloses a technique to be used in data migration from a physical storage apparatus to another physical storage apparatus in a virtual storage apparatus configured with a plurality of physical storage apparatuses. The technique achieves data migration without changing storage apparatus information and volume information recognized by the server and without stopping host I/Os.

SUMMARY

Enterprise-class storage systems demand high availability (HA) functionality provided by clustered storage apparatuses. The HA functionality implements high availability to the storage system. HA configuration is based on a duplicated system, allowing automatic removal of a failed system upon occurrence of a failure to keep working with the remaining normal system.

Active-Active HA configuration uses all the systems as active systems. In the Active-Active HA configuration, the storage system accepts I/O accesses to either volume of a volume pair.

Data migration within a storage system in Active-Active HA configuration demands processing of the data migration without stopping host I/Os while maintaining the Active-Active HA configuration. That is to say, data migration maintaining high availability of Active-Active HA configuration is demanded. However, data migration within the scope of the existing art cannot be performed without stopping host I/Os unless canceling the HA configuration; the storage system loses the high availability in processing data migration.

An aspect of this invention is a storage system including a plurality of storage apparatuses that perform a migration from a pre-migration volume group to a post-migration volume group, wherein the plurality of storage apparatuses are configured to accept a write command directed to any one of a plurality of volumes included in the pre-migration volume group and the post-migration volume group from a host when the migration is being processed, wherein the plurality of storage apparatuses are configured to write write data of the write command to all of the plurality of volumes in a predetermined sequential order, wherein a first storage apparatus in the plurality of storage apparatuses is configured to write the write data to a last volume last among the plurality of volumes, and wherein storage apparatuses in the plurality of storage apparatuses providing volumes different from the last volume are configured to write the write data to the different volumes after individually obtaining exclusive locks and release the exclusive locks after completion of the writing the write data to the last volume.

An aspect of this invention enables a storage system in HA configuration to perform data migration without stopping host I/Os while maintaining the availability.

BRIEF DESCRIPTION OF THE DRAWINGS

FIG. 6A is a diagram illustrating a configuration example of a resource management table in a physical storage apparatus in Embodiment 1;

FIG. 6B is a diagram illustrating a configuration example of a host group management table in a physical storage apparatus in Embodiment 1;

FIG. 7 is a diagram illustrating a configuration example of a virtual storage box management table in a physical storage apparatus in Embodiment 1;

FIG. 8 is a diagram illustrating a configuration example of a virtual storage management table in a physical storage apparatus in Embodiment 1;

FIG. 9A is a diagram illustrating a configuration example of a volume copy pair management table in a physical storage apparatus in Embodiment 1;

FIG. 9B is a diagram illustrating a configuration example of an exclusive lock management table in a physical storage apparatus in Embodiment 1;

FIG. 11 is a diagram illustrating a configuration example of a virtual storage management table in the management computer in Embodiment 1;

FIG. 12 is a diagram illustrating a configuration example of a virtual storage box management table in the management computer in Embodiment 1;

FIG. 13 is a diagram illustrating a configuration example of a virtual storage resource management table in the management computer in Embodiment 1;

FIG. 14 is a diagram illustrating a configuration example of a volume copy pair management table in the management computer in Embodiment 1;

DETAILED DESCRIPTION OF THE EMBODIMENTS

Hereinafter, embodiments of this invention will be described with reference to the accompanying drawings. It should be noted that the embodiments are merely examples to implement this invention and are not to limit the technical scope of this invention. Throughout the drawings, common elements are denoted by the same reference signs.

Embodiment 1

The storage system described hereinafter has Active-Active HA configuration. HA configuration is provided by a duplicated system and implements an automatic failure recovery function that automatically cuts off a failed system upon occurrence of a failure to keep the storage system working with the remaining normal system. Active-Active HA configuration operates all the systems as active systems to achieve effective resource utilization and load balancing. In the following description, the terms HA configuration and HA pair mean Active-Active HA configuration and Active-Active HA pair. The storage system accepts I/O accesses directed to either one of an HA pair.

In the following, migration of an HA volume pair is described. Specifically, migration of an HA volume pair migrates one of a pre-migration HA volume pair to a different volume and creates a post-migration HA volume pair with the other volume of the pre-migration HA volume pair and the new volume. The storage system accepts I/O accesses directed to any of all the volumes when the migration is being processed. The storage system switches HA volume pairs after completion of the migration.

An HA volume pair consists of a primary volume (PVOL) and a secondary volume (SVOL). In an example, the storage system copies data in the PVOL to the SVOL in creating the pair.

As will be described later, when no migration is being processed, the storage system that has received a write command to an SVOL completes writing write data to the PVOL (writing to the write cache or the storage drive) first and then writes the write data to the SVOL. In an example, an I/O access to a PVOL requires an exclusive lock for the PVOL and an I/O access to an SVOL does not need an exclusive lock. The exclusive lock may be acquired in accessing an SVOL.

When a migration is being processed or not being processed, an exclusive lock in a write prohibits another write and a read. An exclusive lock in a read prohibits a write but may prohibit another read operation or not. The exclusive lock in a read permitting another read prevents delay in responding to the host.

Figure 1:
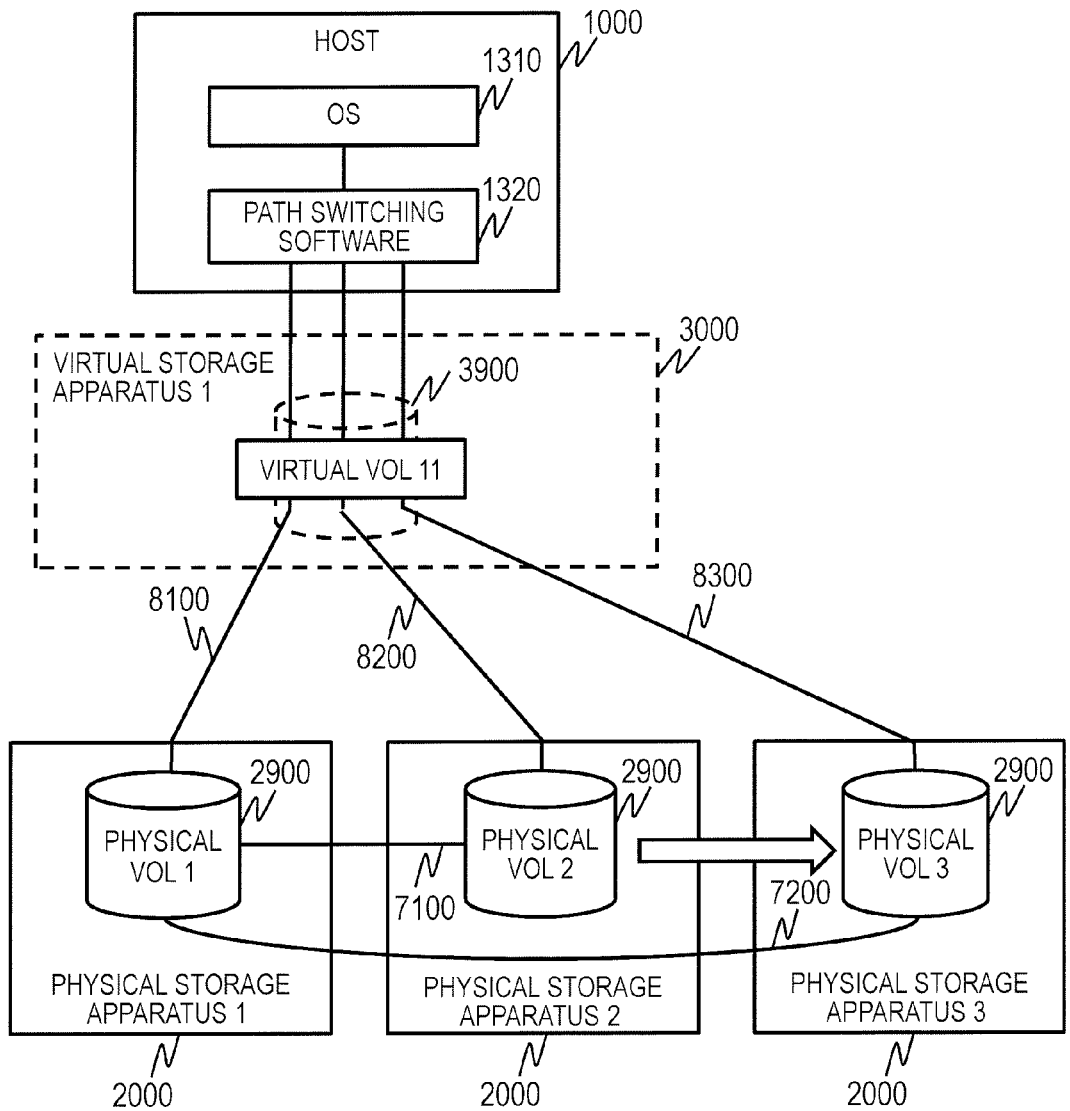
FIG. 1 is a diagram illustrating a general idea of volume pair migration in an HA multi-target configuration in Embodiment 1.

FIG. 1 is a diagram illustrating a general idea of an HA multi-target configuration in a volume migration. The HA multi-target configuration is provided by two HA volume pairs composed of three volumes one of which is defined as the PVOL common to the two HA volume pairs.

The system in FIG. 1 includes a host computer 1000, physical storage apparatuses (also simply referred to storage apparatuses) 2000, and a virtual storage apparatus 3000. The virtual storage apparatus 3000 is configured with a plurality of physical storage apparatuses 2000.

This system has Active-Active HA configuration (hereinafter, also referred to as HA volume configuration) implemented by the physical storage apparatuses 2000. The physical storage apparatuses 2000 are provided for the host computer 1000 as a single virtual storage apparatus 3000. Each physical storage apparatus 2000 provides the same configuration information on the storage apparatus or the configuration information on the virtual storage apparatus 1 (3000) in response to a request from the host computer 1000.

In the example of FIG. 1, a physical VOL 1 (2900) of a physical storage apparatus 1 (2000) and a physical VOL 2 (2900) of a physical storage apparatus 2 (2000) constitute an HA volume pair 7100. The physical VOL 1 (2900) is a PVOL and the physical VOL 2 (2900) is an SVOL.

About each of the physical VOL 1 (2900) and the physical VOL 2 (2900), the host computer 1000 is provided with the same VOL information, namely, information on a virtual VOL 11 (3900). The host computer 1000 can use either path to the physical VOL 1 (2900) or the physical VOL 2 (2900) to access the virtual VOL 11 (3900).

Write data for one of the physical VOLs 2900 is transferred to the other physical VOL 2900, so that the identity of the data is maintained between the physical VOL 1 (2900) and the physical VOL 2 (2900). In response to a read command from the host computer 1000, the physical storage apparatus 1 (2000) or the physical storage apparatus 2 (2000) forwards the data retrieved from its own physical volume 2900.

As understood from the foregoing, the physical VOL 1 (2900) and the physical VOL 2 (2900) can receive I/O accesses from the host computer 1000 as a single volume and even when a failure occurs in either one of the physical volumes, I/O accesses to the other volume are available.

This embodiment describes migration of a volume pair without stopping host I/Os while maintaining Active-Active HA configuration. By way of example, the embodiment describes a migration of data from the physical VOL 2 (2900) to the physical VOL 3. The physical VOL 1 and the physical VOL 2 constitute a pre-migration volume pair and the physical VOL 1 (2900) and the physical VOL 3 (2900) constitute a post-migration volume pair.

First, an HA volume pair 7200 is created with the physical VOL 1 (2900) and the physical VOL 3 (2900). In this example, the physical VOL 1 (2900) is determined to be a PVOL and the physical VOL 3 (2900) to be an SVOL. In the migration, data is copied from the physical VOL 1 (2900) of the PVOL to the physical VOL 3 (2900) of the SVOL.

The host computer 1000 and the physical storage apparatus 3 (2000) define a path 8300 from the host computer 1000 to the physical VOL 3 (2900). In response to a request for information on the physical VOL 3 (2900) from the host computer 1000, the physical storage apparatus 3 (2000) returns information on the virtual VOL 11 (3900) like the information on physical VOL 1 (2900) and the physical VOL 2 (2900).

Next, the host computer 1000 and the physical storage apparatus 2 (2000) delete the path 8200 from the host computer 1000 to the physical VOL 2 (2900). Further, the physical storage apparatus 1 (2000) and physical storage apparatus 2 (2000) deletes the HA volume pair 7100. Through these operations, migration of the physical VOL 2 (2900) in the physical storage apparatus 2 (2000) to the physical VOL 3 (2900) in the physical storage apparatus 3 (2000) is completed.

Figure 2:
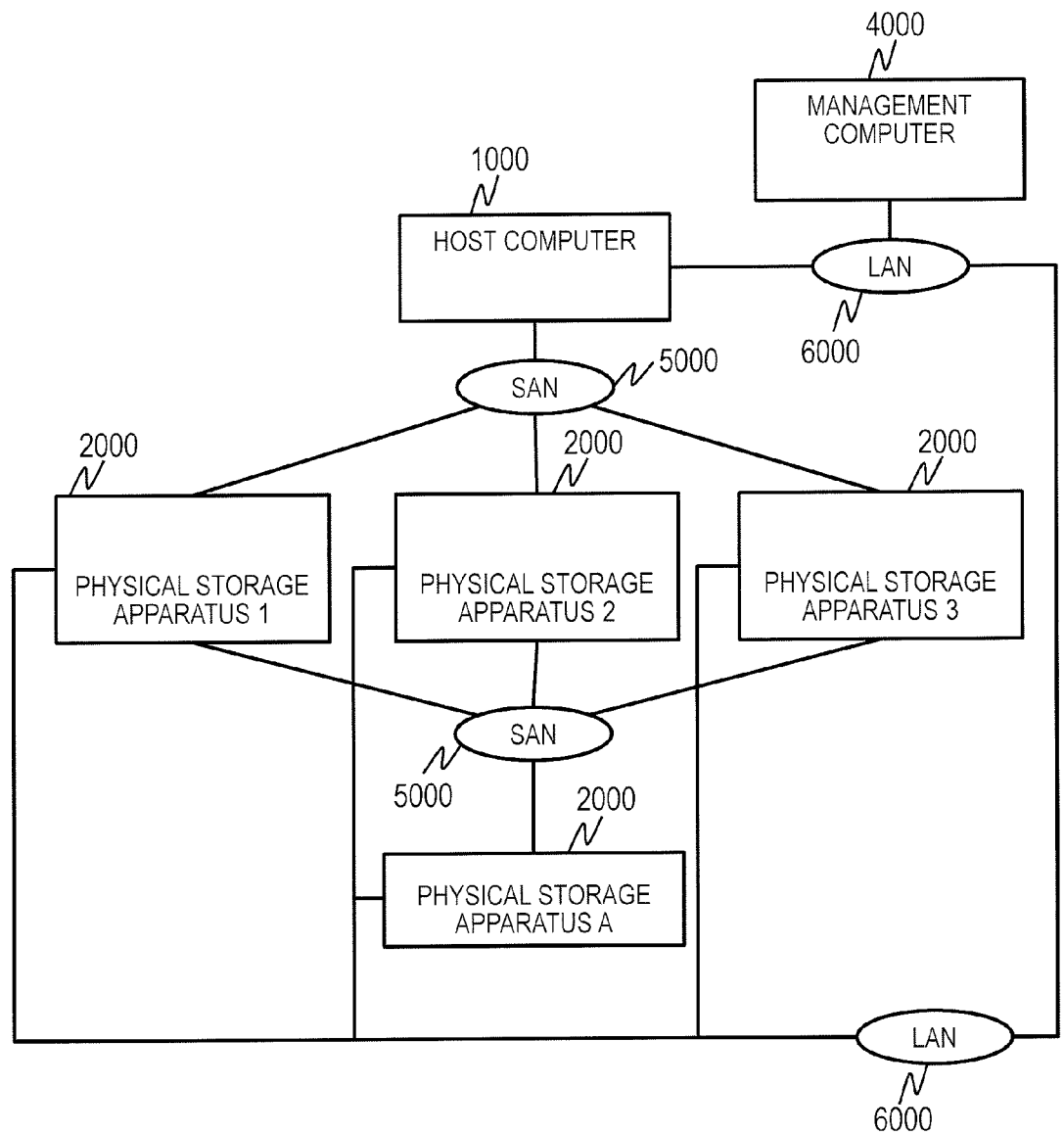
FIG. 2 is a diagram illustrating a configuration example of a computer system in Embodiment 1.

FIG. 2 illustrates a configuration example of a computer system in this embodiment. The computer system in FIG. 2 includes a host computer 1000, physical storage apparatuses 2000, and a management computer 4000.

The number of each kind of apparatuses (systems) included in the computer system depends on the design. The physical storage apparatuses 1 to 3 (2000) form a virtual storage apparatus that is virtually configured as one storage apparatus. In the virtual storage environment of this example, two or three physical storage apparatuses form one virtual storage apparatus; however, the number of constituent physical storage apparatuses depends on the design.

The physical storage apparatus A (2000) includes a quorum disk. The quorum disk provides a function to determine physical storage apparatuses to keep working and physical storage apparatus to stop working among the physical storage apparatuses 2000 implementing HA configuration when communications become unavailable among the physical storage apparatuses 2000 in the HA configuration. The quorum disk prevents a split brain problem.

The host computer 1000, the management computer 4000, and the physical storage apparatuses 2000 are interconnected by a management network configured with a LAN 6000 to be able to communicate with one another. An example of the management network 6000 is an IP network. The management network 6000 may be any type of network as far as it is a network for management data communication.

The host computer 1000 and the physical storage apparatuses 2000 are connected by a data network configured with a SAN (Storage Area Network) 5000. The host computer 1000 accesses the volumes in the physical storage apparatuses 2000 via the SAN 5000. The data network 5000 may be any type of network as far as it is a network for data communication. The data network 5000 and the management network 6000 can be the same network.

Figure 3:
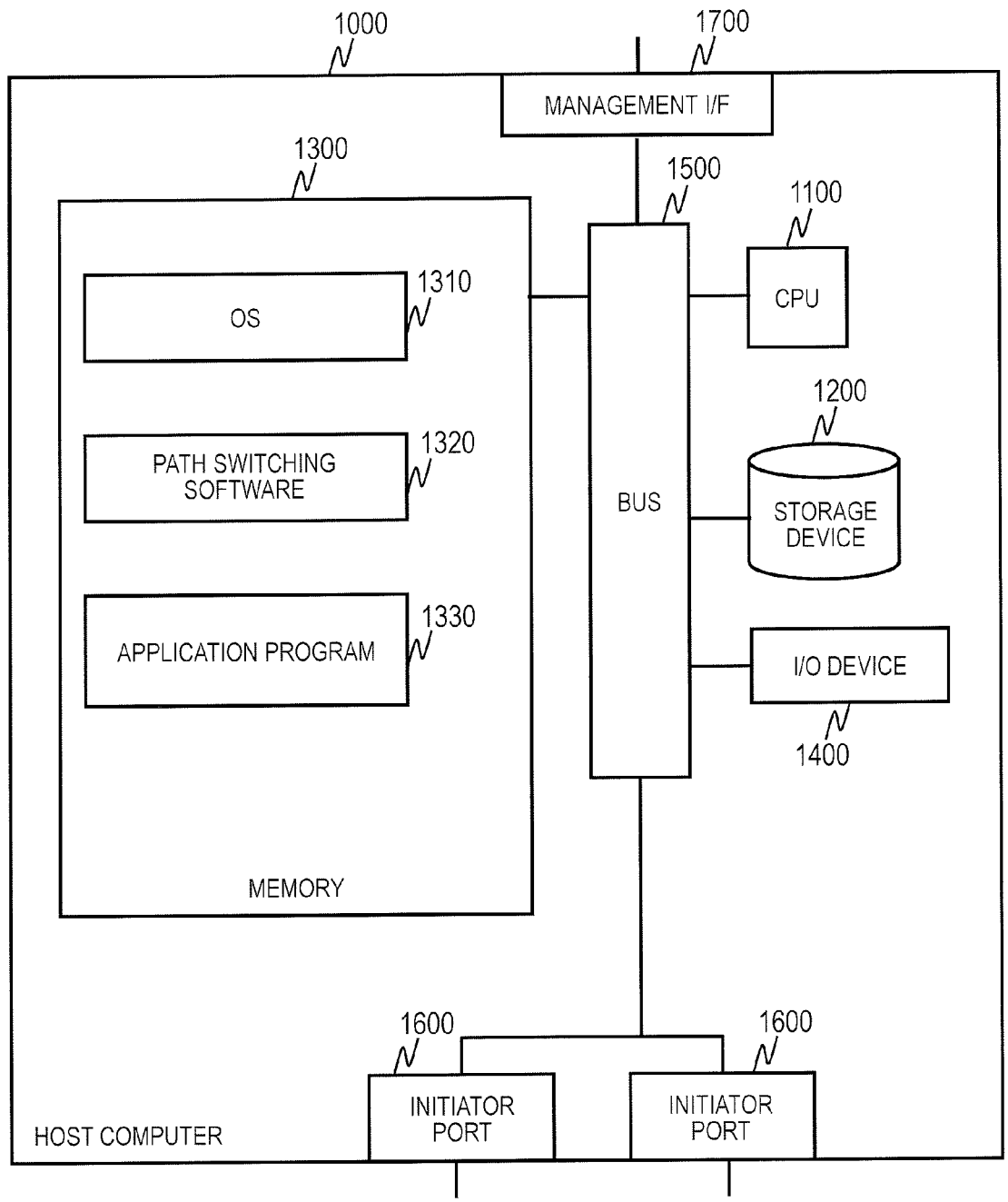
FIG. 3 is a diagram illustrating a configuration example of a host computer in Embodiment 1.

FIG. 3 schematically illustrates a configuration example of the host computer 1000. The host computer 1000 includes a CPU (Central Processing Unit) 1100, a non-volatile secondary storage device 1200, a memory 1300 of a primary storage device, an input/output device 1400, initiator ports 1600 of interfaces for issuing I/O requests, and a management interface 1700. These components are connected by a bus 1500 to be able to communicate with one another.

The CPU 1100 operates in accordance with programs stored in the memory 1300. Typically, programs and data stored in the secondary storage device 1200 are loaded to the memory 1300. In this example, the memory 1300 retains an OS (Operating System) 1310, a path switching program 1320, and an application program 1330. The application program 1330 reads and writes data to and from volumes provided by the physical storage apparatuses 2000.

The initiator ports 1600 are network interfaces connecting with the SAN 5000. The initiator ports 1600 send and receive data and requests to and from the physical storage apparatuses 2000 via the SAN 5000.

The management interface 1700 is a network interface connecting with the LAN 6000. The management interface 1700 sends and receives management data and control instructions to and from the physical storage apparatuses 2000 via the LAN 6000. The management interface 1700 further sends and receives management data and control instructions to and from the management computer 4000 via the LAN 6000.

Figure 4:
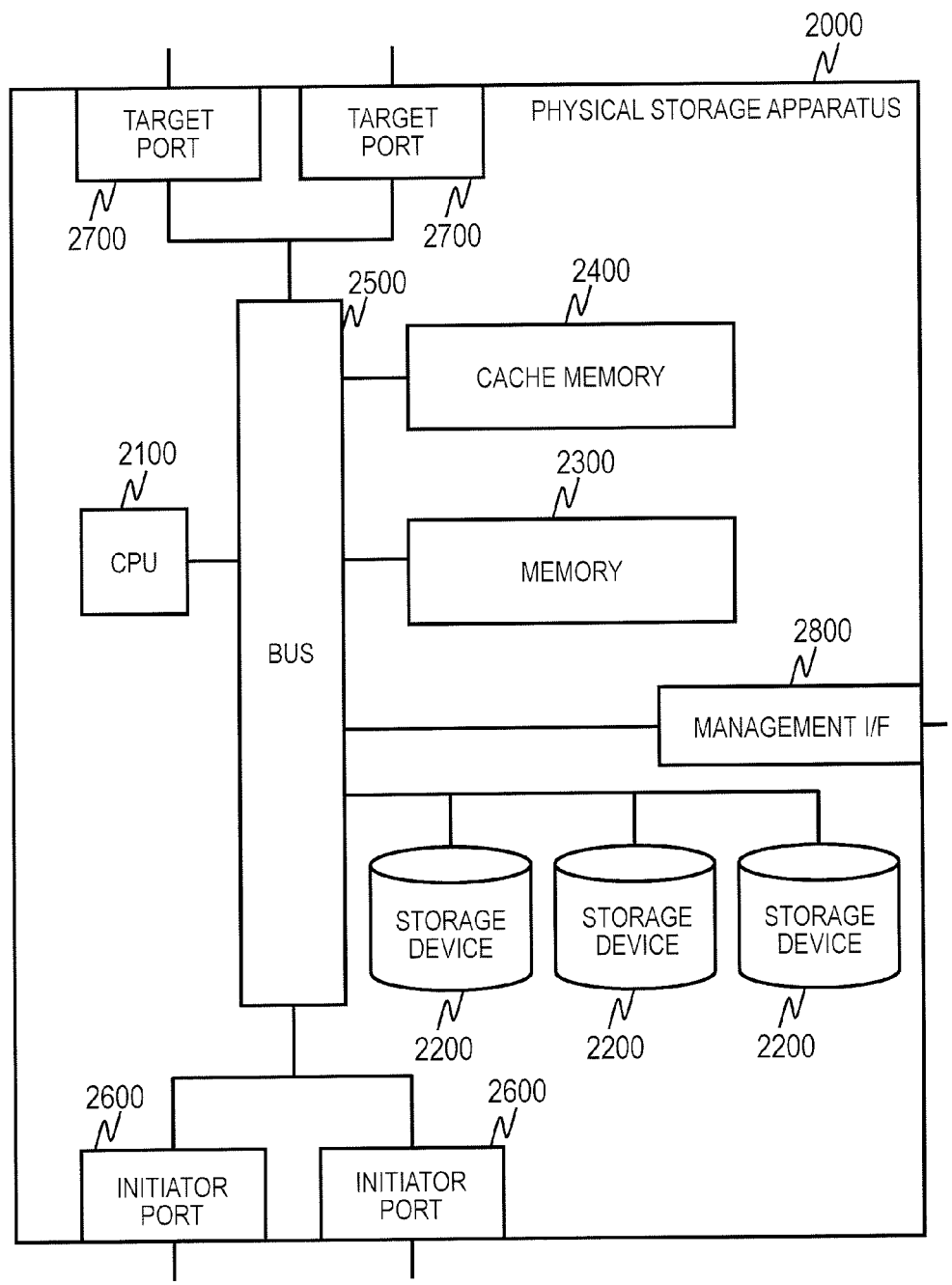
FIG. 4 is a diagram illustrating a configuration example of a physical storage apparatus in Embodiment 1.

FIG. 4 is a diagram schematically illustrating a configuration example of a physical storage apparatus 2000. In this example, all the physical storage apparatuses 2000 have the same basic configuration; however, the numbers of components and the storage capacity depend on the physical storage apparatus 2000. The storage apparatuses 2000 may have different basic configurations. The physical storage apparatus 2000 includes a plurality of storage devices (such as hard disk drives and/or SSDs (Solid State Drives)) 2200 and a storage controller for controlling the physical storage apparatus 2000 to manage volumes and to communicate data with the host computer 1000 or another physical storage apparatus 2000.

The storage controller includes a CPU 2100 of a processor, a program memory 2300, initiator ports 2600 of interfaces for issuing I/O requests, target ports 2700 of interfaces for receiving I/O requests, a management interface 2800, and a cache memory 2400 for transferring data. These components of the storage apparatus 2000 are connected by a bus 2500 to be able to communicate with one another.

The physical storage apparatus 2000 connects to an external (another) physical storage apparatus 2000 via an initiator port 2600 to send an I/O request and write data to the external storage apparatus 2000 or to receive read data from the external storage apparatus 2000. The initiator port 2600 connects with the SAN 5000.

The initiator port 2600 has a function for converting a protocol used for communications with external physical storage apparatuses 2000, such as FC, Fibre Channel over Ethernet (FCoE), or iSCSI, into a protocol used inside the storage controller, such as PCIe.

The storage apparatus 2000 connects to the host computer 1000 or an external physical storage apparatus 2000 at a target port 2700. The physical storage apparatus 2000 receives an I/O request and write data from the host computer 1000 or an external physical storage apparatus 2000 via the target port 2700 and sends read data to the host computer 1000 or an external storage apparatus 2000 via the target port 2700. The target port 2700 connects with the SAN 5000.

The target port 2700 has a function for converting a protocol used for communications with the host computer 1000 and external physical storage apparatuses 2000, such as FC, Fibre Channel Over Ethernet (FCoE), or iSCSI, into a protocol used inside the storage controller, such as PCIe.

The management interface 2800 is a device for connecting to the LAN 6000. The management interface 2800 has a function for converting the protocol used in the LAN 6000 into the protocol used inside the storage controller, such as PCIe.

The CPU 2100 executes a program for controlling the physical storage apparatus 2000 to implement predetermined functions including controlling I/Os from the host computer 1000 as well as managing and controlling the volumes in the physical storage apparatus 2000. At least a part of the functions implemented by the CPU 2100 described in this embodiment may be implemented by a logic circuit different from the CPU 2100.

Programs are executed by a processor (CPU) to perform predetermined processing with the memory and the interfaces. Accordingly, a description having a subject of program in this disclosure may be replaced by a description having a subject of processor. Otherwise, processing performed by a program is processing performed by the apparatus (such as a physical storage apparatus 2000 or the host computer 1000) and the system which run the program.

The program memory 2300 stores data and programs to be handled by the CPU 2100. The data in the program memory 2300 is loaded to the program memory 2300 from a storage device including a non-transitory storage medium such as one of the storage devices 2200 in the physical storage apparatus 2000, a flash memory (not shown), or another apparatus connected through the LAN 6000.

Figure 5:
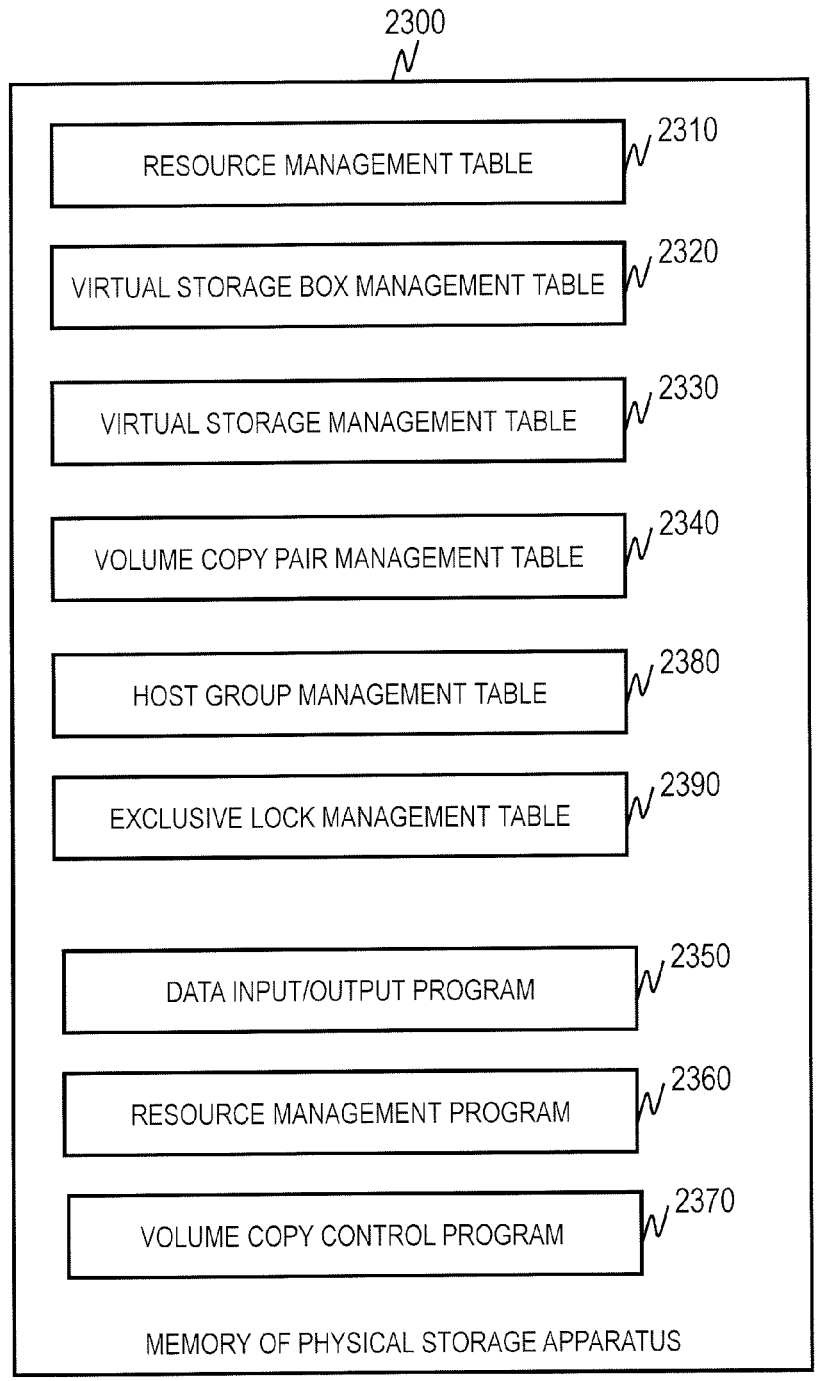
FIG. 5 is a diagram illustrating a configuration example of software in the memory of a physical storage apparatus in Embodiment 1.

FIG. 5 illustrates a configuration example of software in the program memory 2300 of each physical storage apparatus 2000. The program memory 2300 holds a data input/output program 2350, a resource management program 2360, and a volume copy control program 2370. The program memory 2300 further holds a resource management table 2310, a virtual storage box management table 2320, a virtual storage management table 2330, a volume copy pair management table 2340, a host group management table 2380, and an exclusive lock management table 2390.

The data input/output program 2350 performs read and write of user data in accordance with I/O requests from the host computer 1000 and performs necessary data communication with the host computer 1000 and other physical storage apparatuses 2000.

The resource management program 2360 manages the resources of the physical storage apparatus 2000. The resource management program 2360 creates and deletes volumes and further, creates and updates the tables (information) described hereinafter. The resource management program 2360 communicates information necessary for resource management with the management computer 4000.

Hereinafter, tables (information) held by each physical storage apparatus 2000 and referred to in the description of the embodiments are described. The tables having the same name have the same configuration (columns) in the physical storage apparatuses 2000. The tables described hereinafter with reference to the drawings are held by the physical storage apparatus 1 (2000). The information held by the apparatuses may be stored in a structure different from a table.

FIG. 6A illustrates a configuration example of a resource management table 2310. The resource management table 2310 is a table for managing the resources of the physical storage apparatus 1 (2000).

The resource management table 2310 has a resource type column 2311 for storing the types of the resources of the physical storage apparatus 1 (2000), a resource ID column 2312 for storing resource IDs, a resource group ID column 2313 for storing resource group IDs of resource groups the individual resources belong to, and a virtual resource ID column 2314 for storing virtual resource IDs assigned to the resources.

FIG. 6B illustrates a configuration example of a host group management table 2380. A host group is obtained by grouping the WWNs (World Wide Names) of the host computers 1000 connected with the ports depending on the OS type of the host computer 1000. The host group management table 2380 includes a port ID column 2381 for storing port IDs, a host group ID column 2382 for storing host IDs associated with the individual ports, a host mode ID column 2383 for indicating the OS types of the host computer 1000, a host WWN column 2384 for storing host WWNs registered for the individual host groups, and a volume ID column 2385 for storing volume IDs of the volumes accessible by the host computers 1000 belonging to the individual host group IDs 2382.

FIG. 7 illustrates a configuration example of a virtual storage box management table 2320. A virtual storage box is an aggregation of resource groups of the physical storage apparatus allocated to a virtual storage apparatus. The virtual storage box management table 2320 is a table for managing virtual storage boxes of virtual storage apparatuses 3000.

The virtual storage box management table 2320 includes a virtual storage box ID column 2321 for storing virtual storage box IDs and a resource group ID column 2322 for storing resource group IDs belonging to the individual virtual storage boxes.

FIG. 8 illustrates a configuration example of a virtual storage management table 2330. The virtual storage management table 2330 is a table for managing virtual storage apparatuses 3000. The virtual storage management table 2330 includes a virtual storage ID column 2331 for storing virtual storage IDs and a virtual storage box ID column 2332 for storing virtual storage box IDs belonging to the individual virtual storage apparatuses.

FIG. 9A illustrates a configuration example of a volume copy pair management table 2340. The volume copy pair management table 2340 is a table for managing volume copy pairs including the volumes provided by the physical storage apparatus 2000.

The volume copy pair management table 2340 includes a pair ID column 2341 for storing the pair IDs of volume copy pairs, a pair type column 2342 for storing the types of the individual pairs, and a pair status column 2343 for storing the statuses of the individual pairs.

The volume copy pair management table 2340 further includes a PVOL ID column 2344 for storing PVOL IDs and an SVOL ID column 2345 for storing SVOL IDs. In this example, a PVOL ID and an SVOL ID are each composed of identification information of a physical storage apparatus 2000 and identification information of a volume in the physical storage apparatus.

The volume copy pair management table 2340 still further includes an associated pair ID column 2346 for storing pair IDs associated with the individual pairs and a priority column 2347 for storing priority levels of the individual pairs with respect to the associated pairs.

Figure 31:
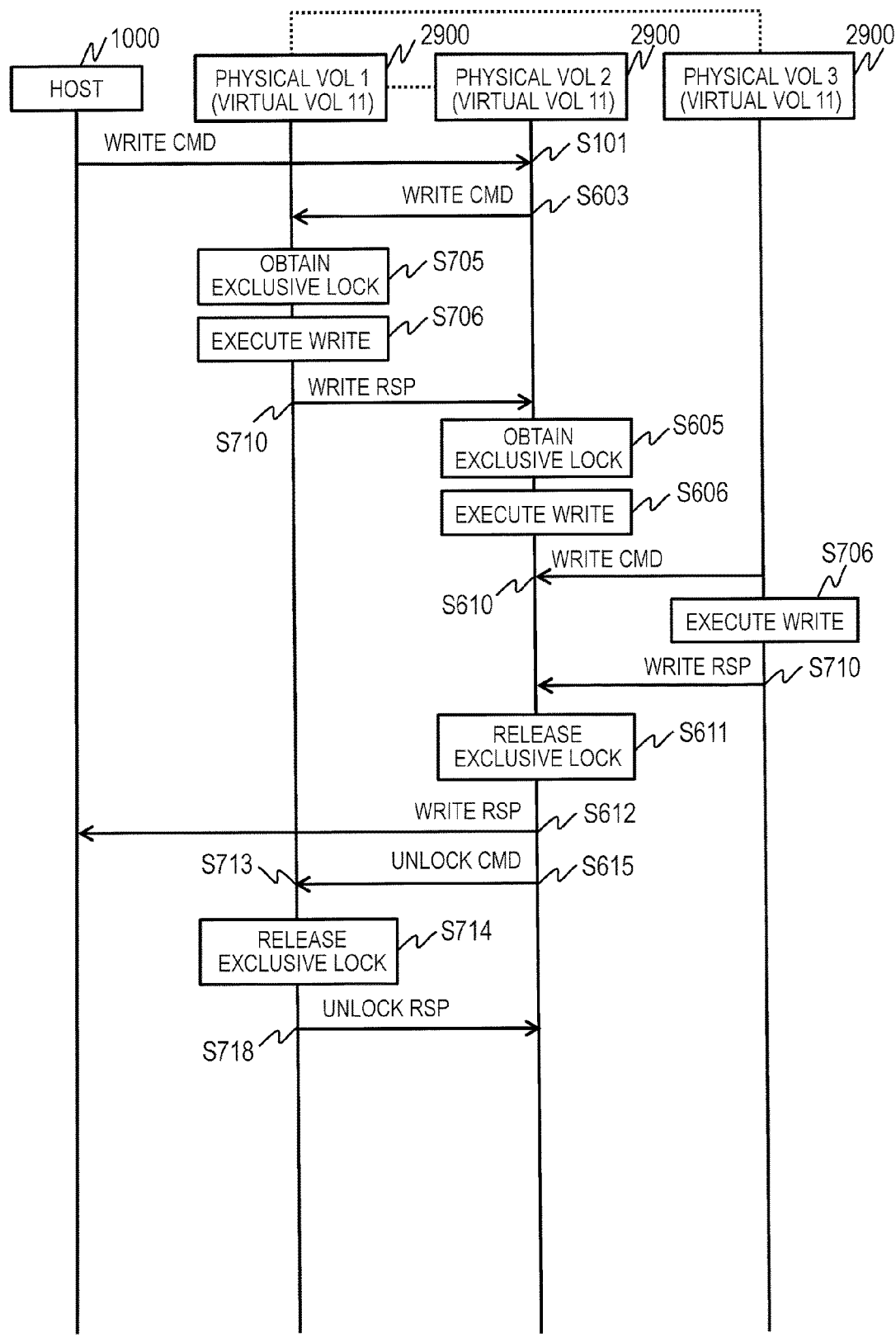
FIG. 31 is a sequence illustrating an example of processing a write command from a host computer to an SVOL of a first pair in an HA cascade configuration in Embodiment 2.

The pair types stored in the pair type column 2342 indicate the types of the individual volume copy pairs, such as "HA" if the pair is for HA, "LC" if the pair is for volume local copy in the physical storage, "RC" if the pair is for volume remote copy between physical storages, "HA-MLT" if the pair is in an HA multi-target configuration, and "HA-CAS" if the pair is in an HA cascade configuration (refer to FIG. 31).

The pair statuses stored in the pair status column 2343 are texts or numerals indicating the data copy statuses in the volume copy pairs, such as "COPY" if the data copy is being processed, "PAIR" if the data copy has been completed and the data is synchronous, and "SUSPEND" if the data copy is suspended.

The priority levels stored in the priority column 2347 indicate information to determine the order of data write in an HA multi-target configuration or an HA cascade configuration. In this embodiment, data is written to the PVOL of the first pair, the SVOL of the first pair, the PVOL of the second pair, and the SVOL of the second pair in this order. The priority level may be determined in accordance with the order of creation of the pairs or determined by the discretion of the user when the HA multi-target configuration or HA cascade configuration is determined.

FIG. 9B illustrates a configuration example of an exclusive lock management table 2390. The exclusive lock management table 2390 holds information for managing exclusive locks for the volumes. The exclusive lock management table 2390 includes an exclusive lock ID column 2391, a volume ID column 2392, and an LBA column 2393.

The exclusive lock management table 2390 manages data storage areas for which an exclusive lock is obtained. Each entry indicates an area in a volume for which an exclusive lock is obtained. The area can be identified by a volume ID and an address (LBA) in the volume which may be specified with a start LBA and a data length. Although this example obtains an exclusive lock for a partial area in a volume, the exclusive lock may be obtained on a volume by volume basis.

Figure 10:
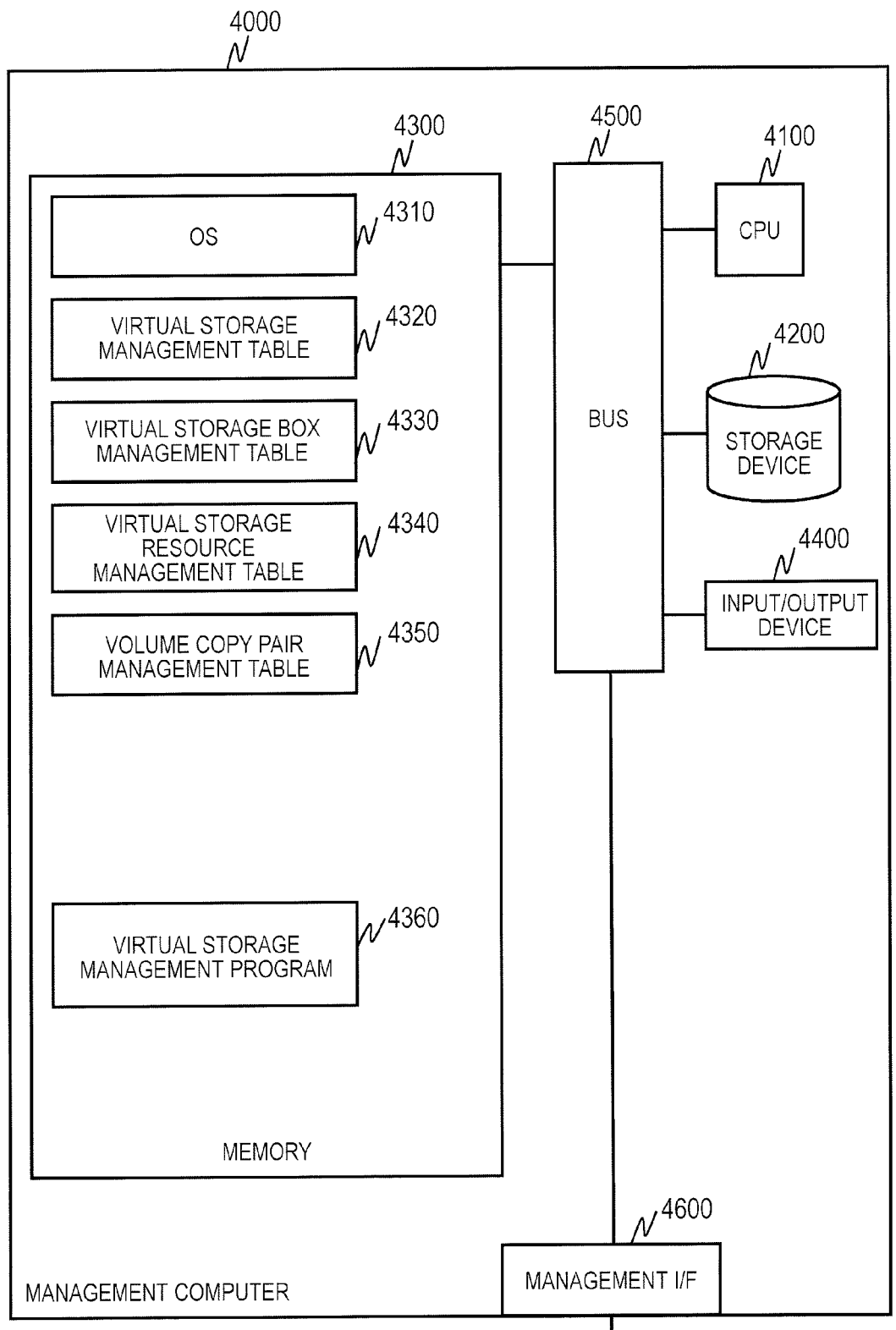
FIG. 10 is a diagram illustrating a configuration example of a management computer in Embodiment 1.

FIG. 10 is a diagram illustrating a configuration example of the management computer 4000. The management computer 4000 includes a CPU 4100 of a processor, a memory 4300 of a primary storage device, a secondary storage device 4200, an input/output device 4400, and a management interface (I/F) 4600. The devices in the management computer 4000 are connected by a bus 4500 to be able to communicate with one another.

The management computer 4000 executes a management program and operates in accordance with the management program. The management I/F 4600 connects with the LAN 6000 and converts the protocol in the computer to and from the protocol of the LAN 6000. The management computer 4000 can communicate with the physical storage apparatuses 2000 and the host computer 1000 through the management I/F 4600 and the LAN 6000.

The input/output device 4400 includes one or more of the devices such as a display, a pointer, and a keyboard. The user (one of the users User 01 to User 03 in the foregoing example) can operate the management computer 4000 with the input/output device 4400 or access the management computer 4000 from a client computer connected via the network. The client computer is included in a management system together with the management computer 4000. The user can input necessary information with the input device (for example, a mouse and a keyboard) and see the necessary information with the output device.

The CPU 4100 implements predetermined functions of the management computer 4000 by executing programs stored in the memory 4300. The memory 4300 stores programs to be executed by the CPU 4100 and data necessary to execute the programs. The programs run on the management computer 4000 will be described later. At least a part of the functions implemented by the CPU 4100 described in this embodiment may be implemented by a logic circuit different from the CPU 4100.

For example, a program is loaded from the secondary storage device 4200 to the memory 4300. The secondary storage device 4200 is a storage device including a non-volatile non-transitory storage medium storing programs and data necessary to implement predetermined functions of the management computer 4000. The secondary storage device 4200 may be an external storage device connected via a network.

Although the management system in this configuration example is configured with the management computer, the management system may be configured with a plurality of computers. One of the plurality of computers may be a computer for display. A plurality of computers may perform processing equivalent to the processing of the management computer for speedy processing and higher reliability in the management. The management system may be configured inside the physical storage apparatuses. A part of the functions of the management system may be implemented in the physical storage apparatuses.

The program memory 4300 of the management computer 4000 stores data and programs to be handled by the CPU 4100. The data in the program memory 4300 is loaded to the program memory 4300 from one of the storage devices 2200 or a flash memory (not shown) in a physical storage apparatus 2000 or another apparatus connected through the LAN 6000.

The program memory 4300 holds an OS 4310 and a virtual storage management program 4360. The program memory 4300 further holds a virtual storage management table 4320, a virtual storage box management table 4330, a virtual storage resource management table 4340, and a volume copy pair management table 4350.

The virtual storage management program 4360 manages the resources of the physical storage apparatuses 2000 and the virtual storage apparatuses 3000. The virtual storage management program 4360 creates and deletes volumes and further, creates and updates the tables (information) described below. The virtual storage management program 4360 exchanges information necessary for resource management with the physical storage apparatuses 2000.

FIG. 11 illustrates a configuration example of a virtual storage management table 4320. The virtual storage management table 4320 is a table for managing virtual storage apparatuses 3000 and the resources of the physical storage apparatuses 2000 that are the constituents of the virtual storage apparatuses 3000. The virtual storage management table 4320 is a table in which the virtual storage management tables 2330 of all the physical storage apparatuses 2000 are unified.

The virtual storage management table 4320 includes a virtual storage ID column 4321 for storing virtual storage IDs and a virtual storage box ID column 4322 for storing virtual storage box IDs of the virtual storage boxes belonging to the individual virtual storages.

FIG. 12 illustrates a configuration example of a virtual storage box management table 4330. The virtual storage box management table 4330 is a table for managing virtual storage boxes of the virtual storage apparatuses 3000. The virtual storage box management table 4330 is a table in which the virtual storage box management tables 2320 of all the physical storage apparatuses 2000 are unified.

The virtual storage box management table 4330 includes a virtual storage box ID column 4331 for storing virtual storage box IDs and a resource group ID column 4332 for storing resource group IDs belonging to the individual virtual storage boxes.

FIG. 13 illustrates a configuration example of a virtual storage resource management table 4340. The virtual storage resource management table 4340 is a table for managing resources of the virtual storage apparatuses 3000. The virtual storage resource management table 4340 is a table in which the resource management tables 2310 of all the physical storage apparatuses 2000 are unified.

The virtual resource management table 4340 has a resource type column 4341 for storing the resource types, a resource ID column 4342 for storing resource IDs of the individual resources, a resource group ID column 4343 for storing resource group IDs of the resource groups the individual resources belong to, and a virtual resource ID column 4344 for storing virtual resource IDs assigned to the resources.

FIG. 14 illustrates a configuration example of a volume copy pair management table 4350. The volume copy pair management table 4350 is a table for managing volume copy pairs in the physical storage apparatuses 2000 managed by the management computer 4000. The volume copy pair management table 4350 is a table in which the volume copy pair management tables 2340 of all the physical storage apparatuses 2000 are unified.

The volume copy pair management table 4350 includes a pair ID column 4351 for storing pair IDs of volume copy pairs, a pair type column 4352 for storing the types of the individual pairs, and a pair status column 4353 for storing statuses of the individual pairs, a PVOL ID column 4354 for storing PVOL IDs, an SVOL ID column 4355 for storing SVOL IDs, an associated pair ID column 4356 for storing pair IDs associated with the individual pairs, and a priority column 4357 for storing priority levels of the individual pairs with respect to the associated pairs. The terms in the columns of the volume copy pair management table 4350 are the same as those in the volume copy pair management table 2340.

Figure 15:
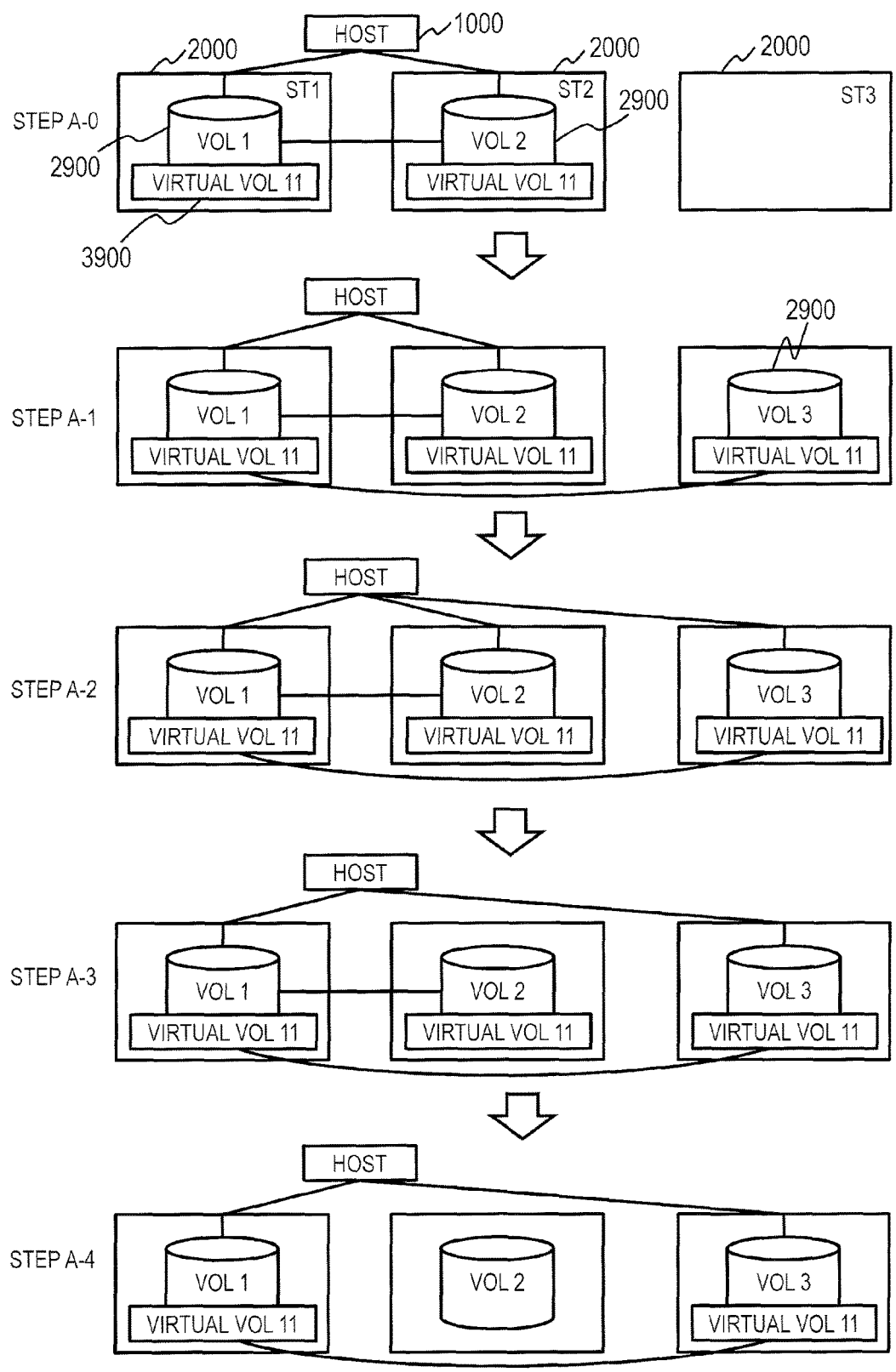
FIG. 15 is a diagram illustrating steps of migration of an HA volume pair in Embodiment 1.

FIG. 15 illustrates steps of migration of a physical VOL 2 (SVOL) 2900 of a physical storage apparatus 2 (ST2) (2000) to a physical VOL 3 (SVOL) 2900 of a physical storage apparatus 3 (ST3) (2000). The physical VOLs 1, 2, and 3 (2900) are constituents of a virtual VOL 11 (3900). In FIG. 15, the reference signs are partially omitted.

The physical VOL 2 (SVOL) 2900 and the physical VOL 1 (PVOL) 2900 are a pre-migration volume pair (first volume pair).

The physical VOL 3 (2900) and the physical VOL 1 (PVOL) 2900 are a post-migration volume pair (second volume pair). In the migration, data in the physical VOL 1 (PVOL) 2900 is copied to the physical VOL 3 (2900). In this example, a system administrator who can manage both of the host and the storage configures paths and volumes.

In FIG. 15, Step A-0 indicates the initial state. Paths are defined between the host computer 1000 and the physical VOL 1 and between the host computer 1000 and the physical VOL 2. The physical VOLs 1 and 2 constitute a volume pair. The physical VOLs 1 and 2 are constituents of a virtual VOL 11; the host computer 1000 can access either one of the physical VOLs 1 and 2 to access the virtual VOL 11.

At Step A-1, the physical storage apparatus 3 creates a physical VOL 3 in accordance with an instruction of the system administrator. The physical storage apparatus 1 (ST1) and the physical storage apparatus 3 (ST3) create an HA volume pair of the physical VOL 1 and the physical VOL 3 in accordance with an instruction of the system administrator. The physical VOL 3 is assigned a virtual ID. At this stage, the VOLs 1, 2, and 3 are in an HA multi-target configuration.

At Step A-2, the host computer 1000 and the physical storage apparatus 3 define a path from the host computer 1000 to the physical VOL 3 in accordance with an instruction of the system administrator. The physical storage apparatus 3 adds information on the WWN of the host, the port ID, and the volume ID of the VOL 3 to the host group management table 2380.

Next, at Step A-3, the host computer 1000 and the physical storage apparatus 2 delete the path from the host computer 1000 to the physical VOL 2 in accordance with an instruction of the system administrator. The physical storage apparatus 2 deletes information on the WWN of the host, the port ID, and the volume ID of the VOL 2 from the host group management table 2380. Next, at Step A-4, the physical storage apparatuses 1 and 2 delete the HA pair of the physical VOLs 1 and 2, and the physical storage apparatus 2 further deletes the virtual ID of the physical VOL 2 in accordance with an instruction of the system administrator.

Figure 16:
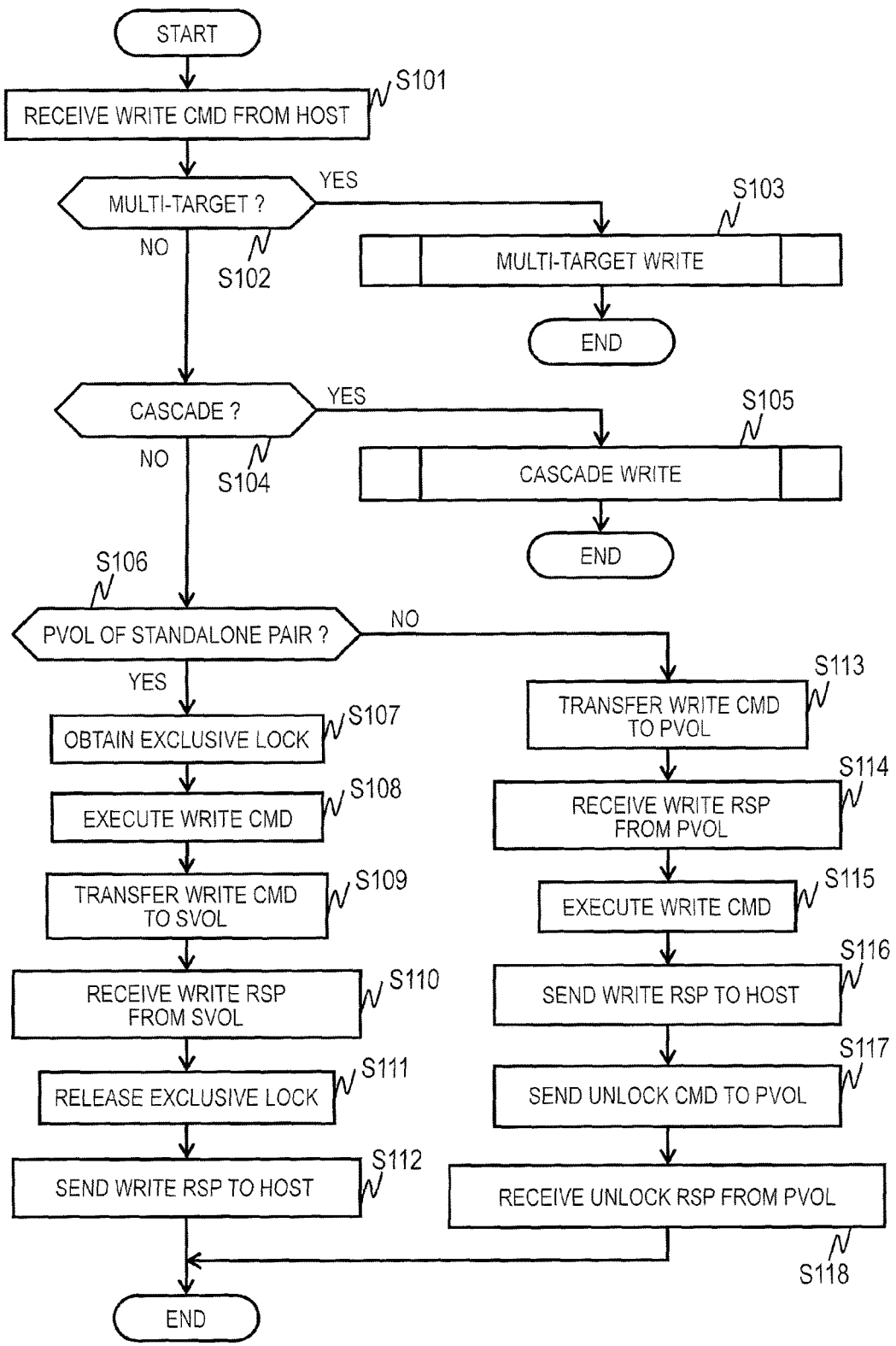
FIG. 16 is a flowchart illustrating an example of processing a write command issued from a host computer to a physical storage apparatus in Embodiment 1.

FIG. 16 is a flowchart illustrating an example of processing of the data input/output program 2350 in a physical storage apparatus 2000 to process a write command issued from the host computer 1000 to the physical storage apparatus 2000. The following description is based on an assumption that the write command includes a data write instruction and write data.

At Step S101, the data input/output program 2350 receives a write command (WRITE CMD) from the host computer 1000. At Step S102, the data input/output program 2350 identifies whether the HA volume pair configuration of the write target volume designated by the write command is HA multi-target configuration (HA-MLT). The data input/output program 2350 refers to the pair type column 2342 in the volume copy pair management table 2340 for this identification.

If the identification result of Step S102 is Yes, the data input/output program 2350 proceeds to Step S103. After completion of Step S103, the data input/output program 2350 exits this flow.

If the identification result of Step S102 is No, the data input/output program 2350 proceeds to Step S104. At Step S104, the data input/output program 2350 identifies whether the configuration of the write target volume copy pair is HA cascade configuration (HA-CAS) with reference to the volume copy pair management table 2340.

If the identification result of Step S104 is Yes, the data input/output program 2350 proceeds to Step S105. After completion of Step S105, the data input/output program 2350 exits this flow.

If the identification result of Step S104 is No, the data input/output program 2350 proceeds to Step S106. At Step S106, the data input/output program 2350 identifies whether the write target volume is a PVOL of a standalone HA volume pair (S-HA) with reference to the volume copy pair management table 2340. The standalone HA volume pair is an HA volume pair that is not in the process of migration.

If the identification result of Step S106 is Yes, or if the access target is a PVOL of a standalone HA volume pair, the data input/output program 2350 proceeds to Step S107. At Step S107, the data input/output program 2350 obtains an exclusive lock. In this example, the data input/output program 2350 obtains an exclusive lock for the address area to be accessed in the access target physical volume.

Obtaining an exclusive lock is control to exclude write/read for the write target data or read target data. The unit to exclude write/read in the control may an LBA or a volume. The information on the state of exclusive locks is managed in the exclusive lock management table 2390 on a control unit basis. The exclusive lock management table 2390 is updated at every obtaining an exclusive lock and every releasing an exclusive lock.

For write target data, other write and read are prohibited. For read target data, other write is prohibited but other read may be prohibited or not. Permitting other read prevents delay in responding to the host computer 1000. The same applies to the other examples.

At Step S108, the data input/output program 2350 writes the write data to the write target volume. The writing write data to the target volume in accordance with a write command means writing to the storage device 2200 or the cache memory 2400. The same applies to the other write processing.

At Step S109, the data input/output program 2350 transfers the write command to the physical storage apparatus 2000 including the paired SVOL. The data input/output program 2350 acquires the identifier of the physical storage apparatus 2000 providing the paired SVOL from the volume copy pair management table 2340.

At Step S110, the data input/output program 2350 receives a write command completion response (WRITE RSP) from the physical storage apparatus 2000 including the SVOL. At Step S111, the data input/output program 2350 releases the exclusive lock obtained for this write command and updates the exclusive lock management table 2390.

At Step S112, the data input/output program 2350 sends a write command completion response to the host computer 1000 and exits this flow.

If the identification result of Step S106 is No, or if the write command designates an SVOL of a standalone HA volume pair, the data input/output program 2350 proceeds to Step S113.

At Step S113, the data input/output program 2350 transfers the write command to the physical storage apparatus 2000 including the paired PVOL. The data input/output program 2350 acquires the identifiers of the physical storage apparatus 2000 providing the paired PVOL and the SVOL in the physical storage apparatus 2000 running the data input/output program 2350 from the volume copy pair management table 2340.

At Step S114, the data input/output program 2350 receives a write command completion response from the physical storage apparatus 2000 including the PVOL. At Step S115, the data input/output program 2350 writes the write data to the write target volume, or the local SVOL included in the apparatus.

At Step S116, the data input/output program 2350 sends a write command completion response to the host computer 1000. At Step S117, the data input/output program 2350 sends an exclusive lock release command (UNLOCK CMD) to the physical storage apparatus 2000 including the PVOL. The exclusive lock release command includes, for example, the identifier of the write command or the address in the virtual volume designated by the write command.

At Step S118, the data input/output program 2350 receives an exclusive lock release command completion response (UNLOCK RSP) from the physical storage apparatus 2000 including the PVOL and exits this flow.

Figure 21:
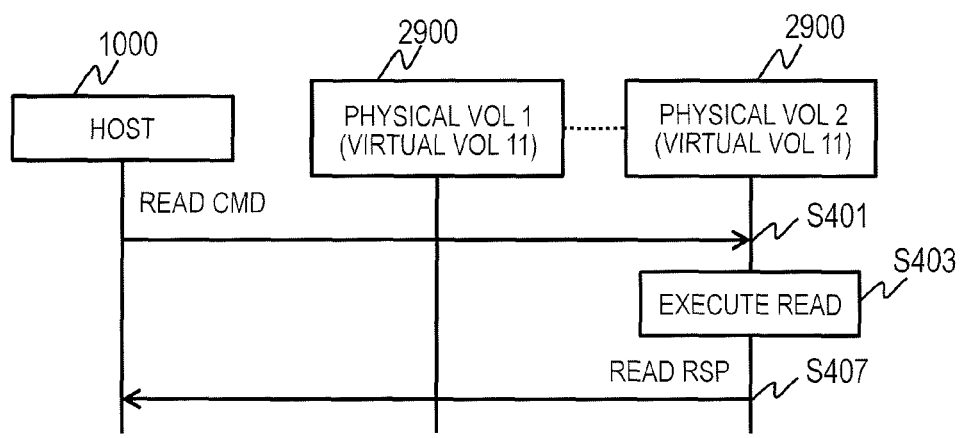
FIG. 21 is a sequence illustrating an example of processing a read command from a host computer directed to an SVOL of an HA standalone volume pair in Embodiment 1.

FIG. 21 illustrates a sequence from Step S107 to Step 112. Step S107 to Step S112 correspond to a flow of a write command from the host computer 1000 to a PVOL of a standalone volume pair.

In FIG. 21, the physical storage apparatus 1 (2000) receives a write command to a physical VOL 1 (virtual VOL 11) 2900 from the host computer 1000 (S101). The physical VOL 1 (2900) is a PVOL of a standalone volume pair. The physical storage apparatus 1 (2000) obtains an exclusive lock for the designated area (S107) and writes the write data (S108).

Subsequently, the physical storage apparatus 1 (2000) transfers the write command to the physical storage apparatus 2 (2000) providing a physical VOL 2 (2900) of the paired SVOL (S109). The physical storage apparatus 2 (2000) writes the transferred write data to the designated area of the physical VOL 2 (2900) without obtaining an exclusive lock (S2101) and returns a write completion response to the physical storage apparatus 1 (2000) (S110). The physical storage apparatus 1 (2000) that has received the write completion response releases the exclusive lock (S111) and returns a write completion response to the host computer 1000 (S112).

Figure 22:
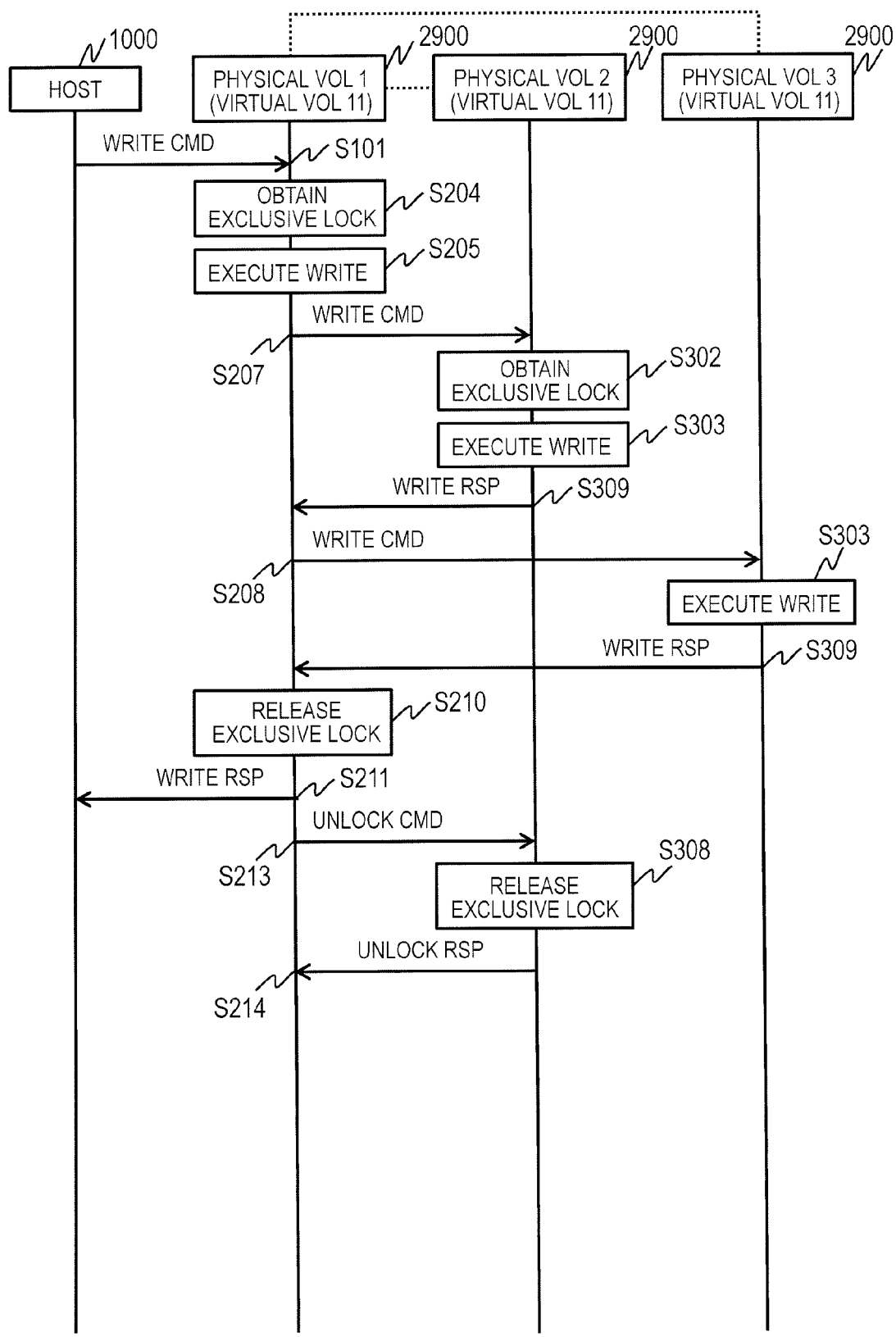
FIG. 22 is a sequence illustrating an example of processing a write command from a host computer to a PVOL of a first pair in an HA multi-target configuration in Embodiment 1.

FIG. 22 illustrates a sequence from Step S113 to Step 118. Step S113 to Step S118 correspond to a flow of a write command from the host computer 1000 to an SVOL of a standalone volume pair.

In FIG. 22, the physical storage apparatus 2 (2000) receives a write command to a physical VOL 2 (virtual VOL 11) 2900 from the host computer 1000 (S101). The physical VOL 2 (2900) is an SVOL of a standalone volume pair. The physical storage apparatus 2 (2000) transfers the write command to the physical storage apparatus 1 (2000) providing the paired PVOL (physical VOL 1 (2900)) (S113).

The physical storage apparatus 1 (2000) obtains an exclusive lock for the designated area of the physical VOL 1 (2900) (S2201) and writes the write data (S2202). The physical storage apparatus 1 (2000) returns a write completion response to the physical storage apparatus 2 (2000) (S114).

The physical storage apparatus 2 (2000) that has received the write completion response writes the write data to the physical VOL 2 (2900) (S115) and returns a write completion response to the host computer 1000 (S116). Subsequently, the physical storage apparatus 2 (2000) sends an exclusive lock release command to the physical storage apparatus 1 (2000) (S117). The physical storage apparatus 1 (2000) releases the exclusive lock (S2203) and returns an exclusive lock release completion response to the physical storage apparatus 2 (2000) (S118).

Figure 23:
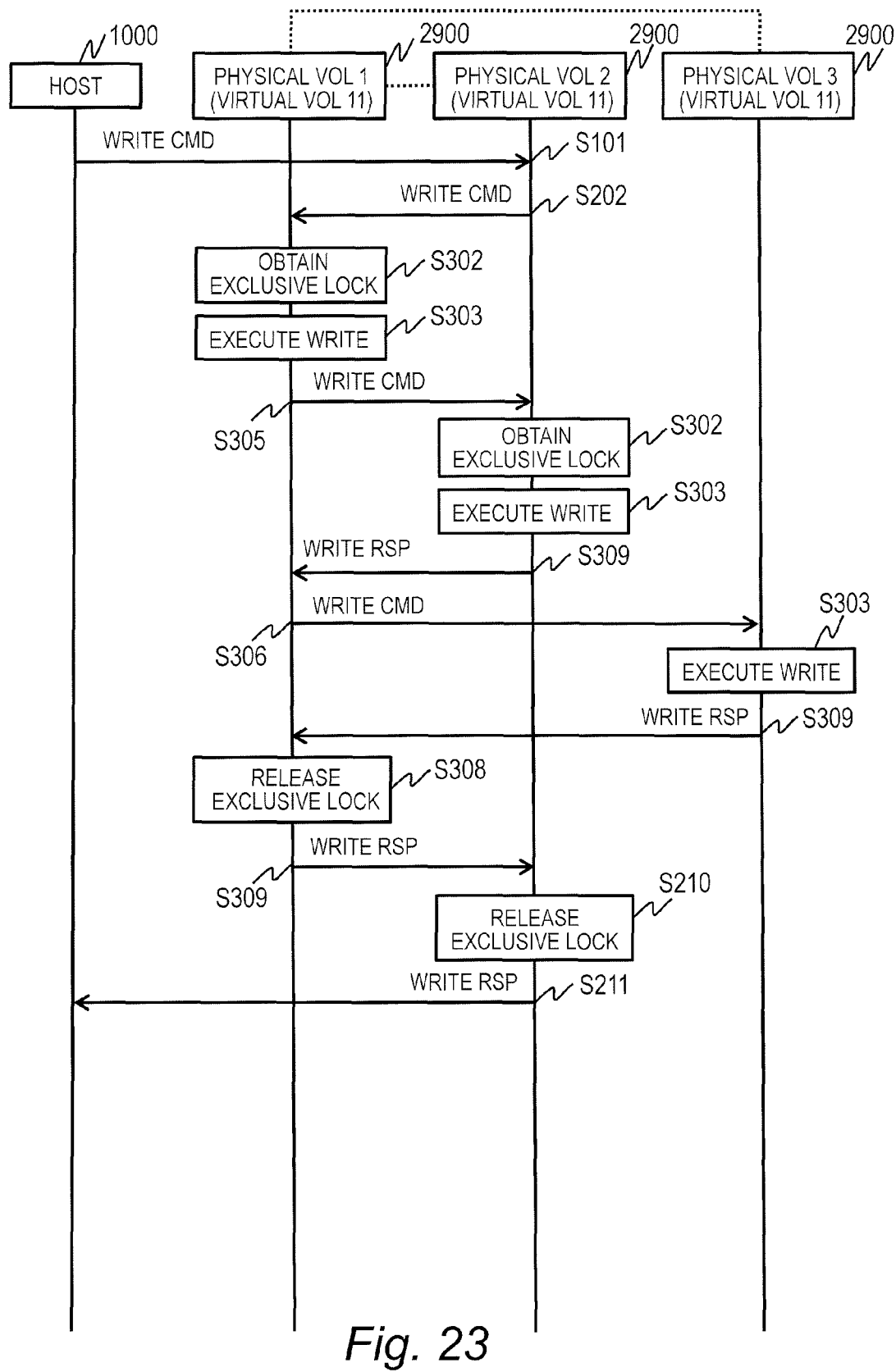
FIG. 23 is a sequence illustrating an example of processing a write command from a host computer to an SVOL of a first pair in an HA multi-target configuration in Embodiment 1.
Figure 24:
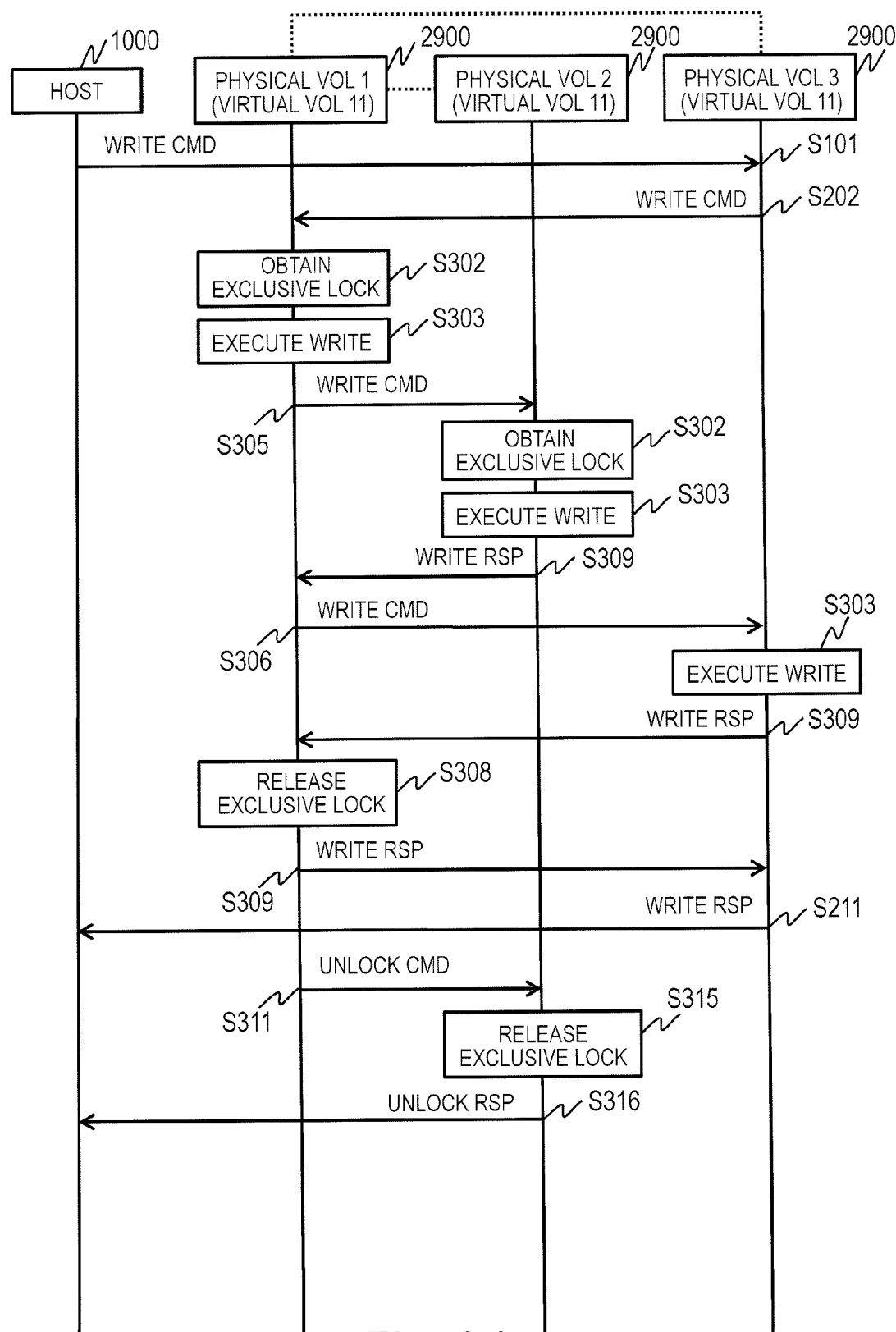
FIG. 24 is a sequence illustrating an example of processing a write command from a host computer to an SVOL of a second pair in an HA multi-target configuration in Embodiment 1.

FIG. 22 illustrates a sequence of processing a write command from the host computer 1000 to a PVOL of a first volume pair in an HA multi-target configuration. FIG. 23 illustrates a sequence of processing a write command from the host computer 1000 to an SVOL of a first volume pair in an HA multi-target configuration. FIG. 24 illustrates a sequence of processing a write command from the host computer 1000 to an SVOL of a second volume pair in an HA multi-target configuration.

With reference to FIG. 22, processing a write command to a PVOL of a first volume pair is described. The physical storage apparatus 1 (2000) receives a write command to a physical VOL 1 (virtual VOL 11) 2900 (S101). The physical VOL 1 (2900) is a PVOL of a first volume pair and a second volume pair. The physical storage apparatus 1 (2000) obtains an exclusive lock for the designated address area in the physical VOL 1 (2900) (S204) and writes the write data (S205).

Next, the physical storage apparatus 1 (2000) transfers the write command to the physical storage apparatus 2 (2000) providing a physical VOL 2 (2900) (S207). The physical VOL 2 (2900) is the SVOL of the first volume pair. The physical storage apparatus 2 (2000) obtains an exclusive lock for the designated address area in the physical VOL 2 (2900) (S302) and writes the write data (S303). Subsequently, the physical storage apparatus 2 (2000) sends a write command completion response to the physical storage apparatus 1 (2000) (S309).

Next, the physical storage apparatus 1 (2000) transfers the write command to the physical storage apparatus 3 (2000) providing a physical VOL 3 (2900) (S208). The physical VOL 3 (2900) is the SVOL of the second volume pair. The physical storage apparatus 3 (2000) writes the write data to the physical VOL 3 (2900) without obtaining an exclusive lock (S303). Subsequently, the physical storage apparatus 3 (2000) sends a write command completion response to the physical storage apparatus 1 (2000) (S309).

Next, the physical storage apparatus 1 (2000) releases the exclusive lock (S210) and returns a write command completion response to the host computer 1000 (S211). Subsequently, the physical storage apparatus 1 (2000) sends an exclusive lock release command to the physical storage apparatus 2 (2000) (S213) and the physical storage apparatus 2 releases the exclusive lock (S308). The physical storage apparatus 1 (2000) receives a completion response to its command (S214).

Sending an exclusive lock release command to another physical storage apparatus 2000 after returning a write command completion response to the host computer 1000 reduces the response time to the host computer 1000. The returning a write command completion response to the host computer 1000 may follow the reception of an exclusive lock release command completion response from another physical storage apparatus 2000. The same applies to the other sequence diagrams.

With reference to FIG. 23, processing a write command to an SVOL of a first volume pair is described. The physical storage apparatus 2 (2000) receives a write command to a physical VOL 2 (virtual VOL 11) 2900 (S101). The physical storage apparatus 2 (2000) transfers the write command to the physical storage apparatus 1 (2000) (S202).

The physical storage apparatus 1 (2000) obtains an exclusive lock for the designated address area in the physical VOL 1 (2900) (S302) and writes the write data (S303). Next, the physical storage apparatus 1 (2000) transfers the write command to the physical storage apparatus 2 (2000) (S305).

The physical storage apparatus 2 (2000) obtains an exclusive lock for the designated address area in the physical VOL 2 (2900) (S302) and writes the write data (S303). Subsequently, the physical storage apparatus 2 (2000) sends a write command completion response to the physical storage apparatus 1 (2000) (S309).

Next, the physical storage apparatus 1 (2000) transfers the write command to the physical storage apparatus 3 (2000) providing a physical VOL 3 (2900) (S306). The physical storage apparatus 3 (2000) writes the write data to the physical VOL 3 (2900) without obtaining an exclusive lock (S303). Subsequently, the physical storage apparatus 3 (2000) sends a write command completion response to the physical storage apparatus 1 (2000) (S309).

The physical storage apparatus 1 (2000) then releases the exclusive lock (S308) and returns a write command completion response to the physical storage apparatus 2 (2000) that has transferred the write command (S309).

Upon receipt of the write command completion response from the physical storage apparatus 1 (2000), the physical storage apparatus 2 (2000) releases the exclusive lock (S210) and returns a write command completion response to the host computer 1000 (S211).

With reference to FIG. 24, processing a write command to an SVOL of a second volume pair is described. The physical storage apparatus 3 (2000) receives a write command to a physical VOL 3 (virtual VOL 11) 2900 (S101). The physical storage apparatus 3 (2000) transfers the write command to the physical storage apparatus 1 (2000) (S202).

The physical storage apparatus 1 (2000) obtains an exclusive lock for the designated address area in the physical VOL 1 (2900) (S302) and writes the write data (S303). Next, the physical storage apparatus 1 (2000) transfers the write command to the physical storage apparatus 2 (2000) (S305).

The physical storage apparatus 2 (2000) obtains an exclusive lock for the designated address area in the physical VOL 2 (2900) (S302) and writes the write data (S303). Subsequently, the physical storage apparatus 2 (2000) sends a write command completion response to the physical storage apparatus 1 (2000) (S309).

Next, the physical storage apparatus 1 (2000) transfers the write command to the physical storage apparatus 3 (2000) providing the physical VOL 3 (2900) (S306). The physical storage apparatus 3 (2000) writes the write data to the physical VOL 3 (2900) without obtaining an exclusive lock (S303). Subsequently, the physical storage apparatus 3 (2000) sends a write command completion response to the physical storage apparatus 1 (2000) (S309).

The physical storage apparatus 1 (2000) then releases the exclusive lock (S308) and returns a write command completion response to the physical storage apparatus 3 (2000) that has transferred the write command (S309).

Upon receipt of the write command completion response from the physical storage apparatus 1 (2000), the physical storage apparatus 3 (2000) returns a write command completion response to the host computer 1000 (S211).

After returning the write command completion response, the physical storage apparatus 1 (2000) sends an exclusive lock release command to the physical storage apparatus 2 (2000) (S311). The physical storage apparatus 2 (2000) receives the exclusive lock release command (S314), releases the exclusive lock (S315), and returns an exclusive lock release command completion response to the physical storage apparatus 1 (2000) (S316).

Figure 17:
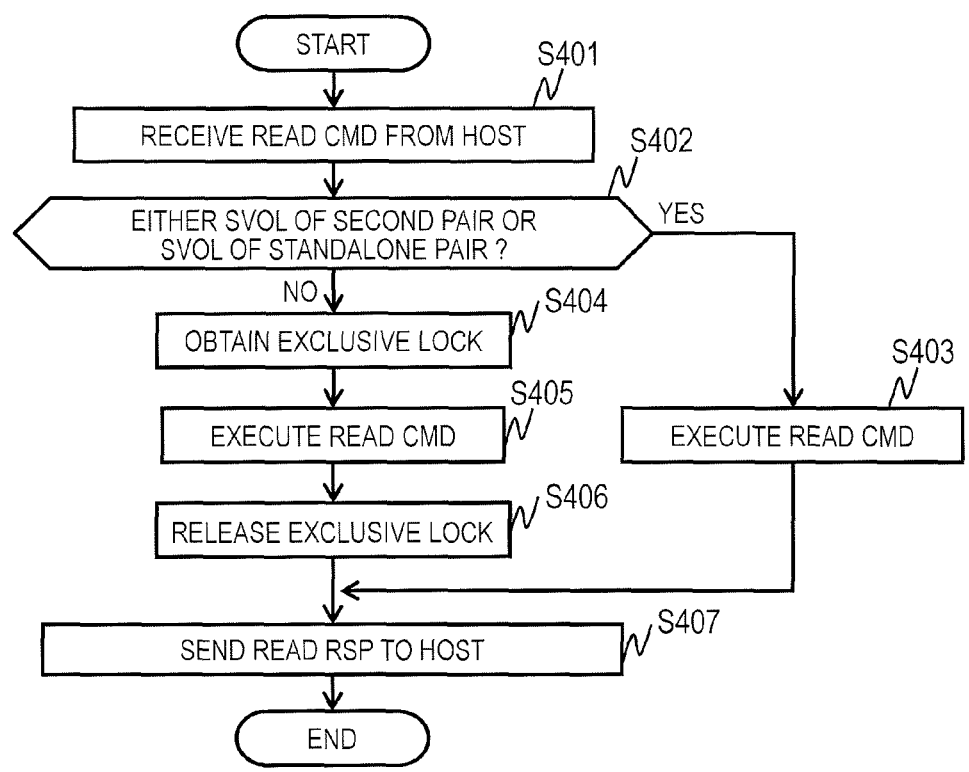
FIG. 17 is a flowchart illustrating an example of processing a read command issued from a host computer to a physical storage apparatus.
Figure 18:
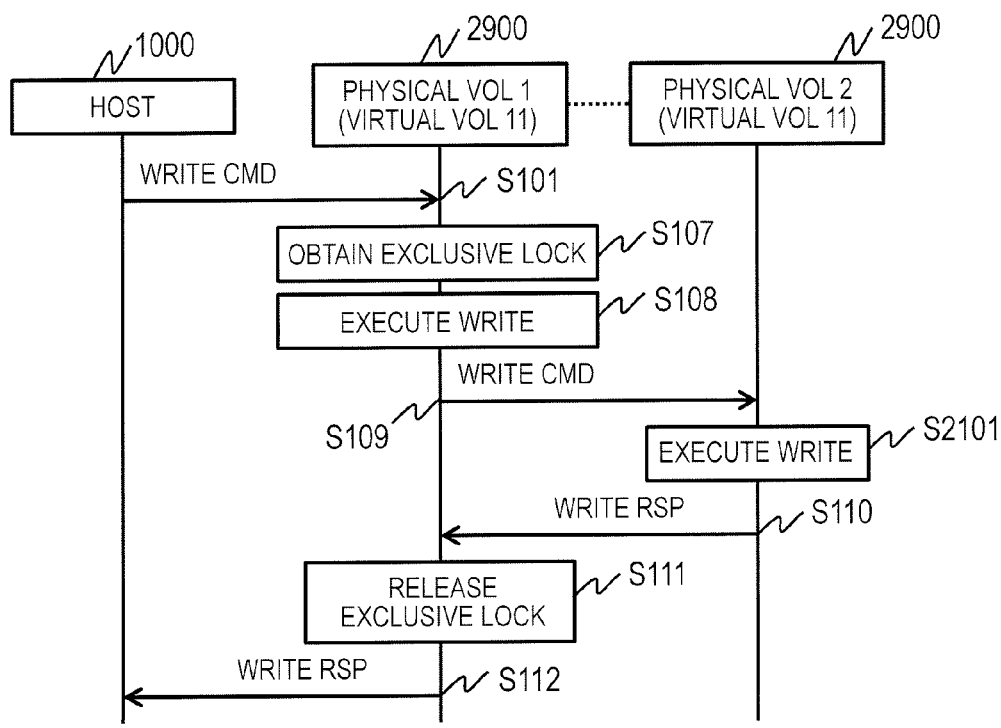
FIG. 18 is a sequence illustrating an example of processing a write command from a host computer to a PVOL of an HA standalone volume pair in Embodiment 1.
Figure 19:
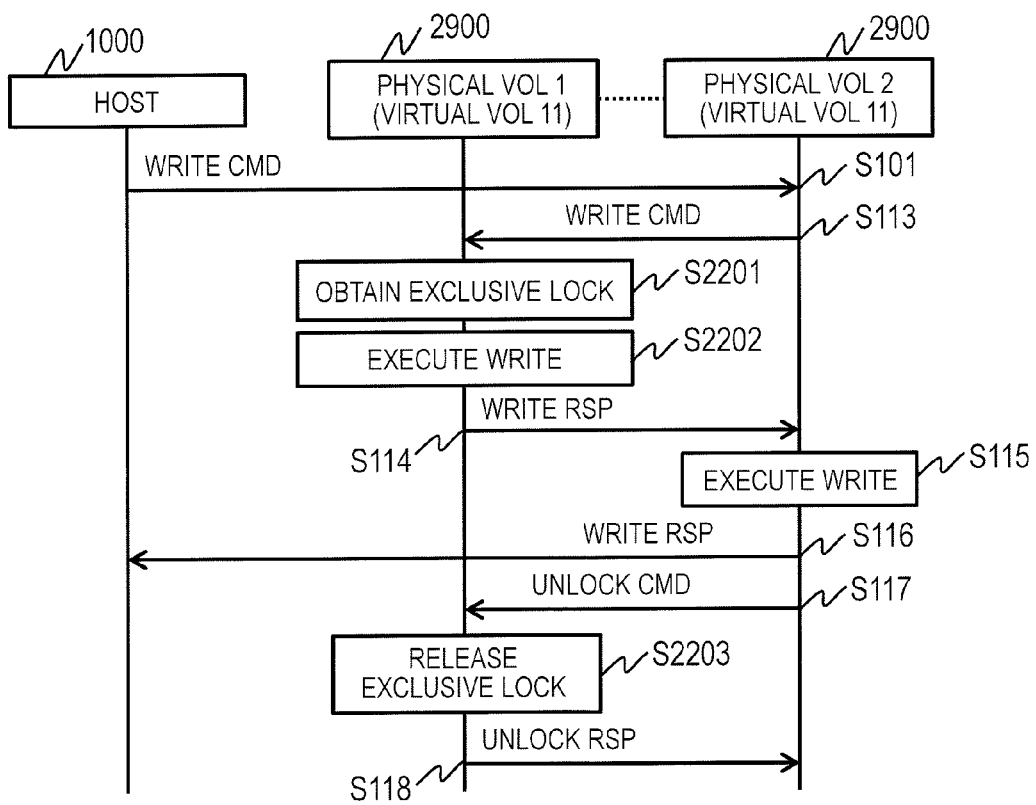
FIG. 19 is a sequence illustrating an example of processing a write command from a host computer to an SVOL of an HA standalone volume pair in Embodiment 1.

FIG. 17 is a flowchart illustrating an example of processing of the data input/output program 2350 in a physical storage apparatus 2000 to process a read command issued from the host computer 1000 to the physical storage apparatus 2000. In the following description, retrieving from a physical volume means retrieving from a storage device 2000 or a cache memory 2400.

At Step S401, the data input/output program 2350 receives a read command (READ CMD) from the host. At Step S402, the data input/output program 2350 identifies whether the read target volume is either an SVOL of a second volume pair or an SVOL of a standalone volume pair.

The data input/output program 2350 refers to the volume copy pair management table 2340 in the identification.

If the identification result of Step S402 is Yes, the data input/output program 2350 retrieves data from the read target volume at Step S403 and proceeds to Step S407.

If the identification result of Step S402 is No, the data input/output program 2350 obtains an exclusive lock at Step S404 and retrieves data from the read target volume at Step S405. At Step S406, the data input/output program 2350 releases the exclusive lock and proceeds to Step S407. At Step S407, the data input/output program 2350 sends a read command completion response (READ RSP) including the retrieved data to the host computer 1000 and exits this flow.

Figure 20:
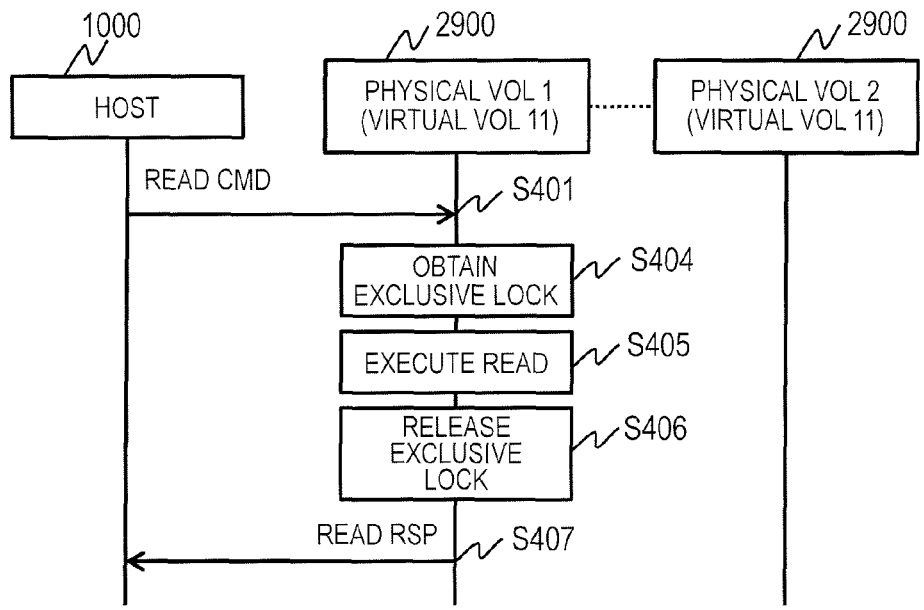
FIG. 20 is a sequence illustrating an example of processing a read command from a host computer directed to a PVOL of an HA standalone volume pair in Embodiment 1.
Figure 25:
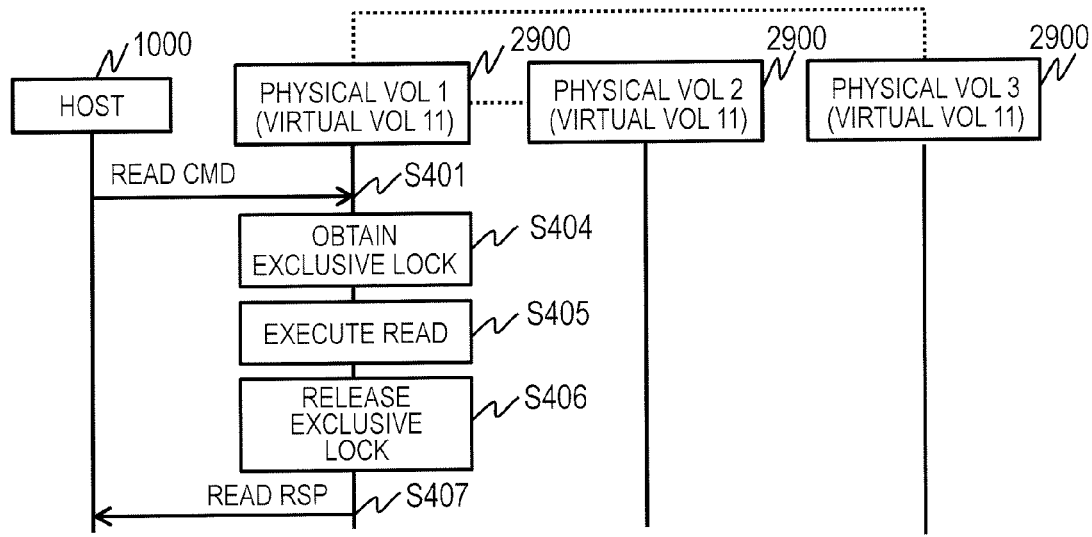
FIG. 25 is a sequence illustrating an example of processing a read command from a host computer directed to a PVOL of a first pair in an HA multi-target configuration in Embodiment 1.
Figure 26:
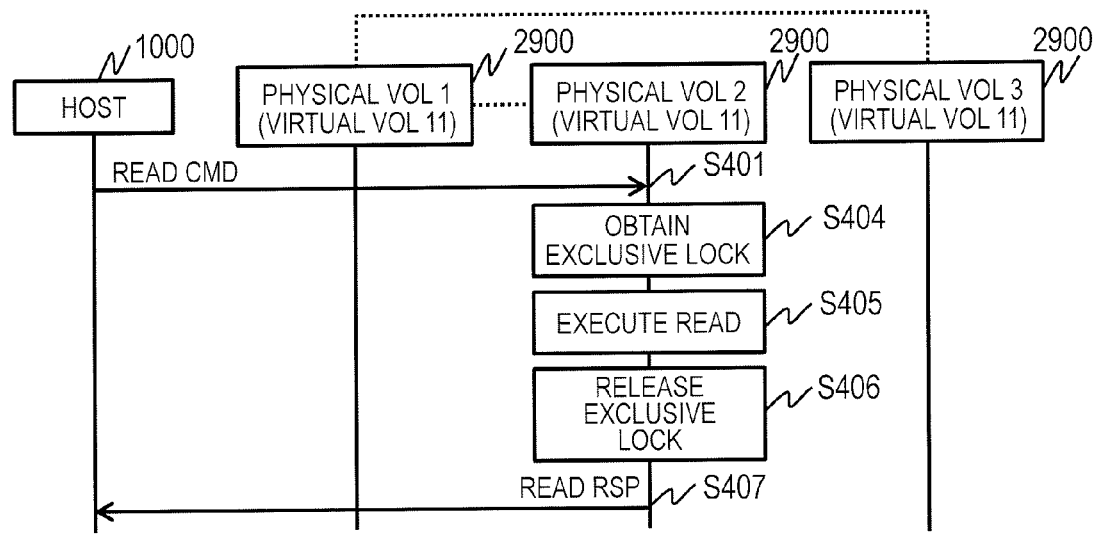
FIG. 26 is a sequence illustrating an example of processing a read command from a host computer directed to an SVOL of a first pair in an HA multi-target configuration in Embodiment 1.
Figure 27:
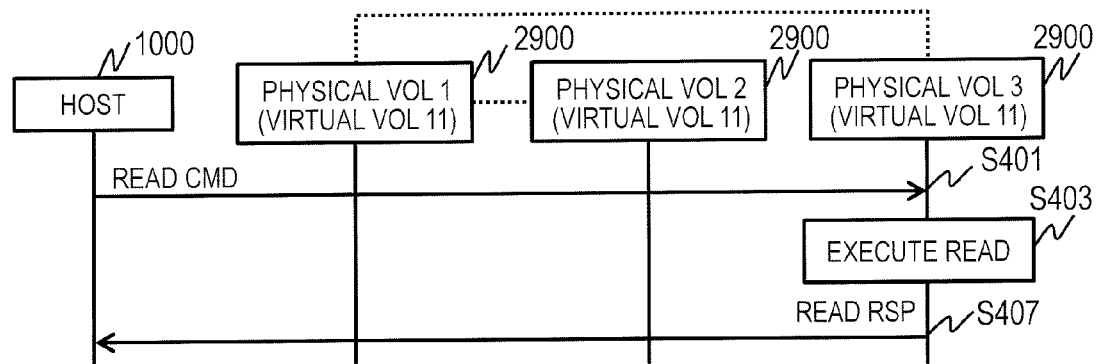
FIG. 27 is a sequence illustrating an example of processing a read command from a host computer directed to an SVOL of a second pair in an HA multi-target configuration in Embodiment 1.

FIGS. 20, 21, 25, 26, and 27 illustrate sequences corresponding to the flowchart of FIG. 17. FIG. 20 illustrates a sequence of processing a read command directed to a PVOL of a standalone volume pair. FIG. 21 illustrates a sequence of processing a read command directed to an SVOL of a standalone volume pair. FIG. 25 illustrates a sequence of processing a read command directed to a PVOL of a first volume pair. FIG. 26 illustrates a sequence of processing a read command directed to an SVOL of a first volume pair. FIG. 27 illustrates a sequence of processing a read command directed to an SVOL of a second volume pair.

In FIG. 20, the physical storage apparatus 1 (2000) receives a read command directed to the physical VOL 1 (virtual VOL 11) (S401). The physical storage apparatus 1 (2000) obtains an exclusive lock for the designated address area (S404) and retrieves read data from the designated address area (S405). The physical storage apparatus 1 (2000) releases the exclusive lock (S406) and returns a read command completion response together with the read data to the host computer 1000 (S407).

In FIG. 21, the physical storage apparatus 2 (2000) receives a read command directed to the physical VOL 2 (virtual VOL 11) (S401). The physical storage apparatus 2 (2000) retrieves read data from the designated address area without obtaining an exclusive lock (S403). The physical storage apparatus 2 (2000) returns a read command completion response together with the read data to the host computer 1000 (S407).

The sequence of FIG. 25 is the same as the sequence of FIG. 20. The sequence of FIG. 26 is the same as the sequence of FIG. 20 except that the physical storage apparatus 2 (2000), instead of the physical storage apparatus 1 (2000), performs the processing. The sequence of FIG. 27 is the same as the sequence of FIG. 21 except that the physical VOL 2 (2900) and the physical storage apparatus 2 (2000) are replaced by the physical VOL 3 (2900) and the physical storage apparatus 3 (2000), respectively.

This embodiment enables migration of a volume in an HA multi-target configuration without stopping host I/Os while maintaining high availability.

Although the above-described example does not obtain an exclusive lock for the volume (last volume) where the write data is written last for the efficiency in processing, an exclusive lock may be obtained in writing to the last volume. For example, the exclusive lock may be obtained after a write command is received from another physical storage apparatus 2000. The read processing when a volume migration is being processed may be the same as the read processing of an HA standalone volume pair when no migration is being processed.

Although the above-described example performs migration of a volume pair, the above description is applicable to a migration of a volume in a volume group composed of three or more volumes. The above-described description is applicable to a storage system including three or more physical storage apparatuses.

As described above, the same order of writing write data between when a volume migration is being processed and when not being processed enables the functionality of a storage system to be configured efficiently. The orders of writing may be different between when a volume migration is being processed and when not being processed. Taking an example of the foregoing example, the order of writing to the physical VOL 2 and the physical VOL 3 may be replaced. The same applies to the other embodiments.

Embodiment 2

Figure 28:
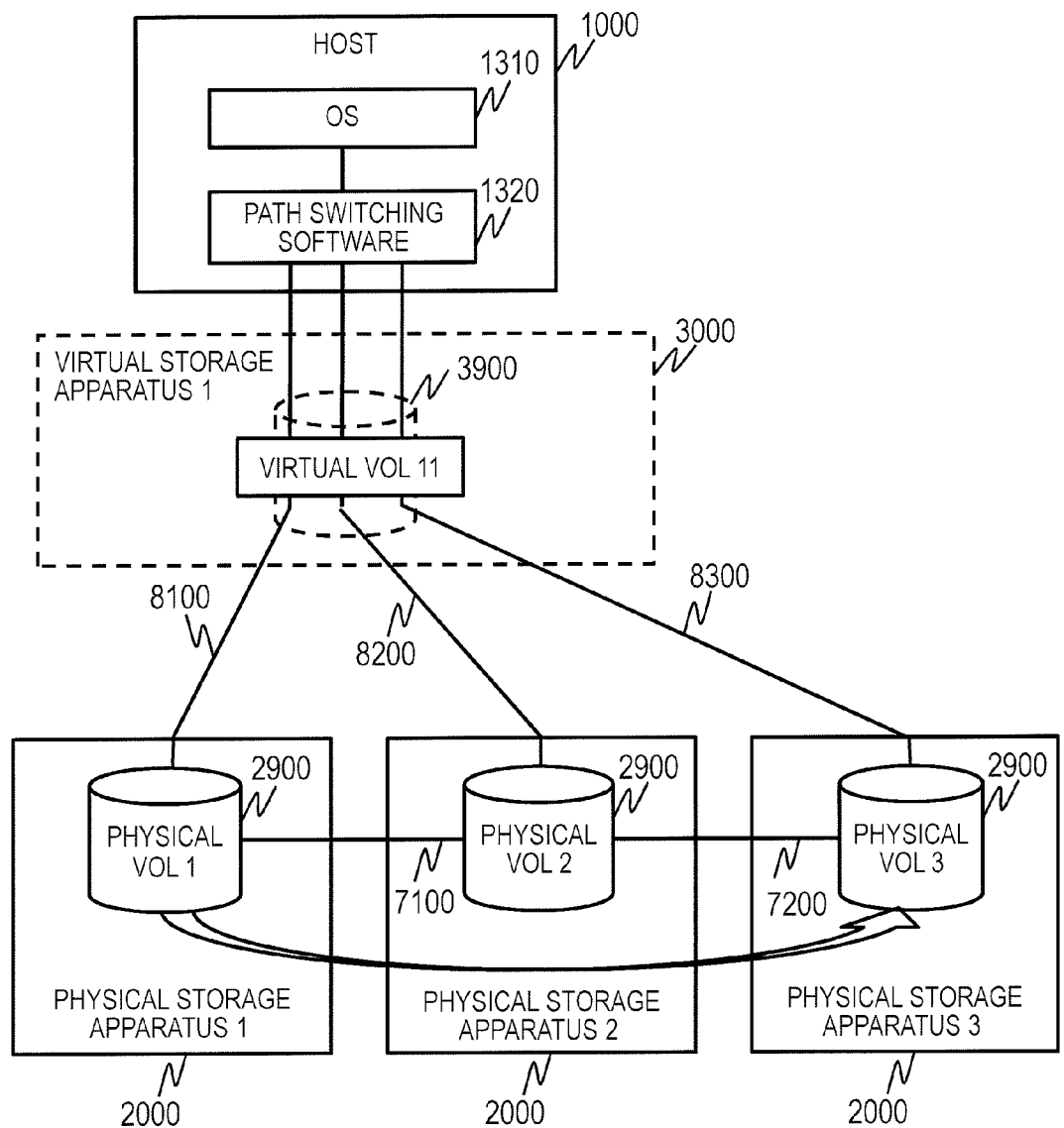
FIG. 28 is a diagram illustrating a feature of this invention in an HA cascade configuration in Embodiment 2.

Hereinafter, Embodiment 2 is described. Differences from Embodiment 1 are mainly described. FIG. 28 illustrates data migration (volume migration) in this embodiment. This embodiment migrates a physical VOL 1 (2900) to a physical VOL 3 (2900). Before and after the migration, a physical VOL 2 (2900) is common. FIG. 28 illustrates a general idea of an HA cascade configuration in a volume migration.

The HA cascade configuration includes two HA volume pairs composed of three volumes one of which is defined as an SVOL of an HA volume pair and a PVOL of the other HA volume pair.

The physical VOL 1 (2900) and the physical VOL 2 (2900) constitute an HA volume pair 7100. To perform a migration, an HA volume pair 7200 is created first with the physical VOL 2 (2900) and the physical VOL 3 (2900). In the HA volume pair 7200, the physical VOL 2 is defined as a PVOL and the physical VOL 3 as an SVOL. In the migration, data is copied from the physical VOL 2 of the PVOL to the physical VOL 3 of the SVOL.

Next, the host computer 1000 and the physical storage apparatus 3 (2000) define a path 8300 from the host computer 1000 to the physical VOL 3 (2900). In response to a request for information on the physical VOL 3 (2900) from the host computer 1000, the physical storage apparatus 3 (2000) returns information on a virtual VOL 11 (3900), like the physical VOL 1 (2900) and the physical VOL 2 (2900).

Next, the host computer 1000 and the physical storage apparatus 1 (2000) delete the path 8100 from the host computer 1000 to the physical VOL 2. Furthermore, the physical storage apparatus 1 (2000) and the physical storage apparatus 2 (2000) delete the HA volume pair 7100. Through these operations, migration of the physical VOL 2 (2900) of the physical storage apparatus 2 (2000) to the physical VOL 3 (2900) of the physical storage apparatus 3 (2000) is completed.

Figure 29:
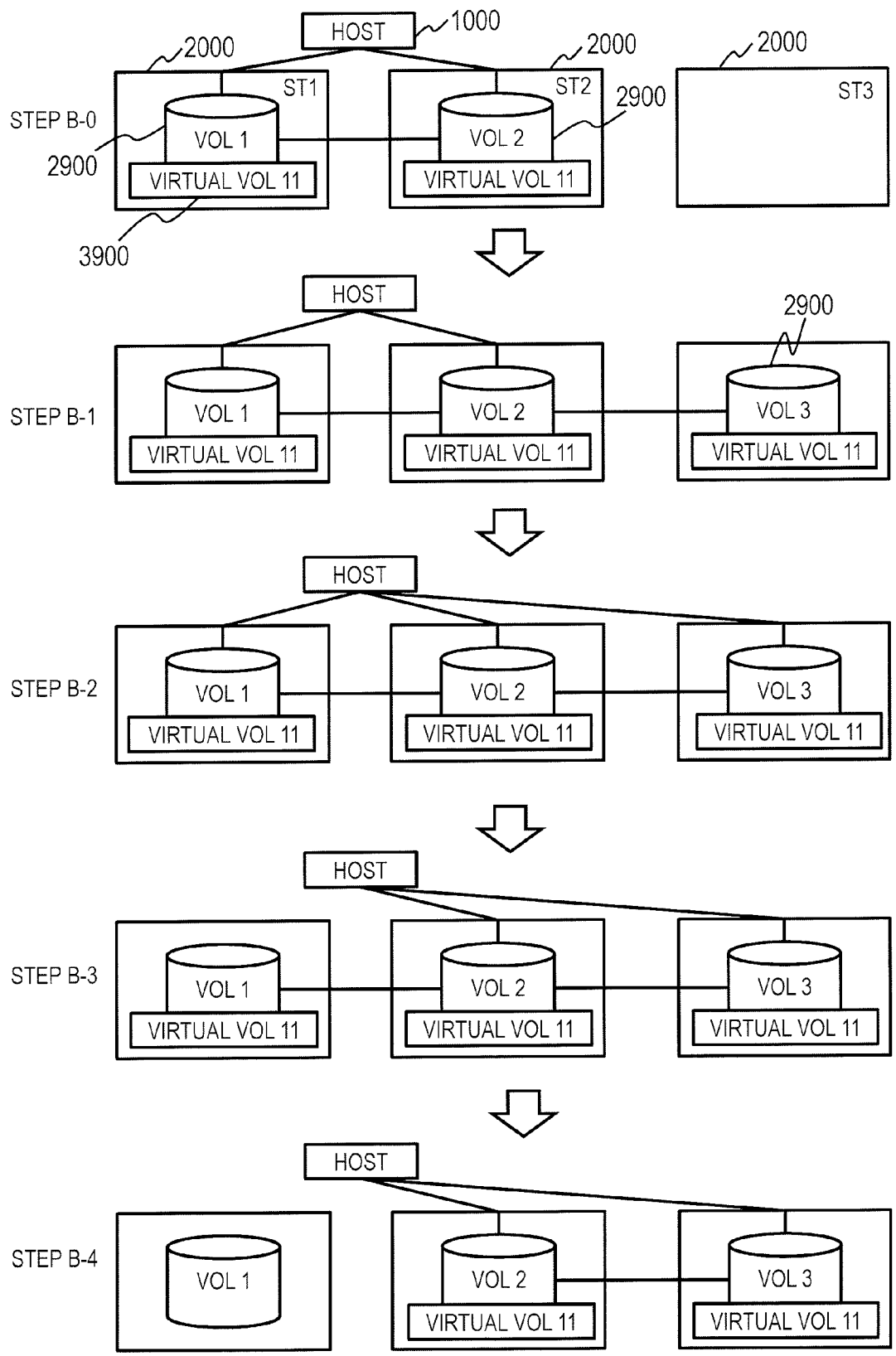
FIG. 29 is a diagram illustrating steps of migration of an HA volume pair in Embodiment 2.

FIG. 29 illustrates steps of migration of a PVOL (VOL 1) in a physical storage apparatus 1 (ST1) to a physical storage apparatus 3 (ST3). The post-migration physical volume is a physical VOL 3. In this embodiment, the system administrator executes these steps. In FIG. 29, the reference signs are partially omitted.

Step B-0 indicates the initial state. Paths are defined between the host computer 1000 and the physical VOL 1 and between the host computer 1000 and the physical VOL 2. The physical VOLs 1 and 2 constitute a volume pair. The physical VOLs 1 and 2 are constituents of a virtual VOL 11; the host computer 1000 can access either one of the physical VOLs 1 and 2 to access the virtual VOL 11.

At Step B-1, the physical storage apparatus 3 creates a physical VOL 3 in accordance with an instruction of the system administrator. The physical storage apparatus 2 (ST2) and the physical storage apparatus 3 (ST3) create an HA volume pair of the physical VOL 2 and the physical VOL 3 in accordance with an instruction of the system administrator. At this stage, the VOLs 1, 2, and 3 are in an HA cascade configuration.

At Step B-2, the host computer 1000 and the physical storage apparatus 3 define a path from the host computer 1000 to the physical VOL 3 in accordance with an instruction of the system administrator. The physical storage apparatus 3 adds information on the WWN of the host, the port ID, and the volume ID of the VOL 3 to the host group management table 2380.

Next, at Step B-3, the host computer 1000 and the physical storage apparatus 1 delete the path from the host computer 1000 to the physical VOL 1 in accordance with an instruction of the system administrator. The physical storage apparatus 1 deletes information on the WWN of the host, the port ID, and the volume ID of the VOL 2 from the host group management table 2380.

Next, at Step B-4, the physical storage apparatuses 1 and 2 delete the HA pair of the physical VOLs 1 and 2, and the physical storage apparatus 1 further deletes the virtual ID of the physical VOL 1 in accordance with an instruction of the system administrator.

Figure 30:
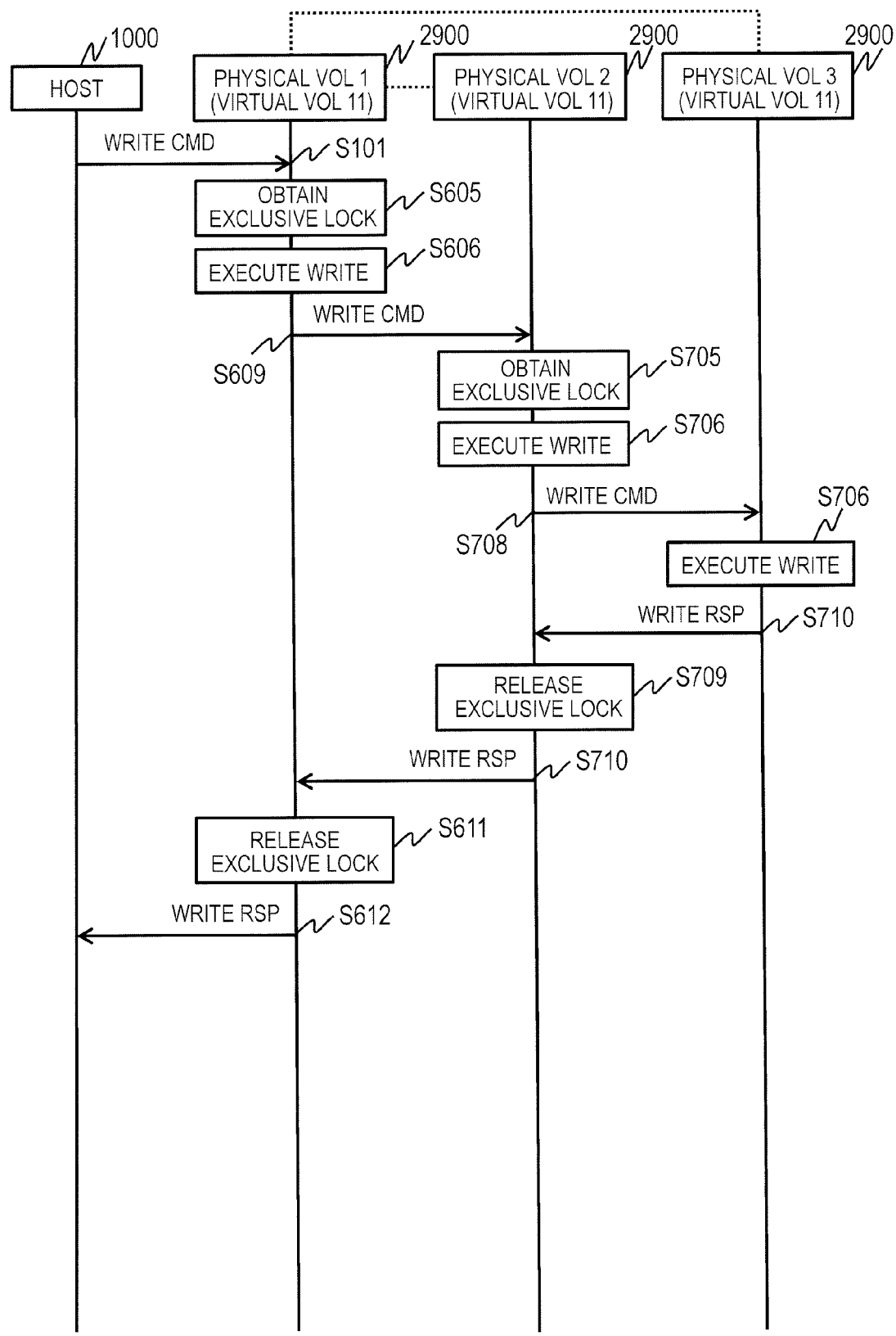
FIG. 30 is a sequence illustrating an example of processing a write command from a host computer to a PVOL of a first pair in an HA cascade configuration in Embodiment 2.
Figure 32:
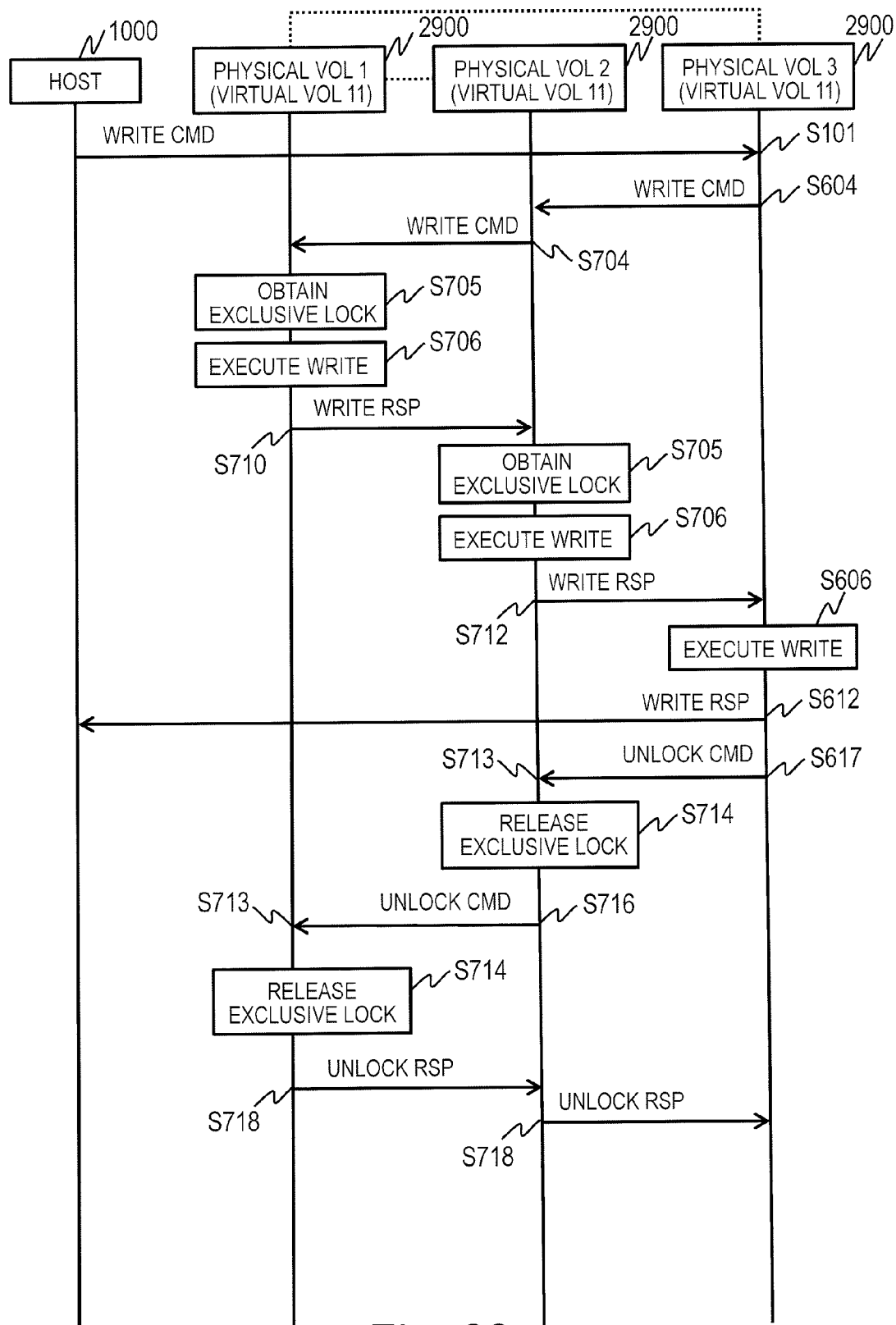
FIG. 32 is a sequence illustrating an example of processing a write command from a host computer to an SVOL of a second pair in an HA cascade configuration in Embodiment 2.

FIG. 30 illustrates a sequence of processing a write command from the host computer 1000 to a PVOL of a first volume pair in an HA cascade configuration. FIG. 31 illustrates a sequence of processing a write command from the host computer 1000 to an SVOL of a first volume pair in an HA cascade configuration. FIG. 32 illustrates a sequence of processing a write command from the host computer 1000 to an SVOL of a second volume pair in an HA cascade configuration.

In FIG. 30, the physical storage apparatus 1 (2000) receives a write command to a physical VOL 1 (virtual VOL 11) 2900 (S101). The physical VOL 1 (2900) is a PVOL of a first volume pair. The physical storage apparatus 1 (2000) obtains an exclusive lock for the designated address area in the physical VOL 1 (2900) (S605) and writes the write data (S606).

Next, the physical storage apparatus 1 (2000) transfers the write command to the physical storage apparatus 2 (2000) providing a physical VOL 2 (2900) (S609). The physical VOL 2 (2900) is the SVOL of the first volume pair and the PVOL of the second volume pair.

The physical storage apparatus 2 (2000) obtains an exclusive lock for the designated address area in the physical VOL 2 (2900) (S705) and writes the write data (S706). Subsequently, the physical storage apparatus 2 (2000) transfers the write command to the physical storage apparatus 3 (2000) providing the physical VOL 3 (2900) (S708). The physical VOL (2900) is the SVOL of the second volume pair.

The physical storage apparatus 3 (2000) writes the write data to the physical VOL 3 (2900) without obtaining an exclusive lock (S706). Subsequently, the physical storage apparatus 3 (2000) sends a write command completion response to the physical storage apparatus 2 (2000) (S710).

Upon receipt of the write command completion response from the physical storage apparatus 3 (2000), the physical storage apparatus 2 (2000) releases the exclusive lock (S709) and returns a write command completion response to the physical storage apparatus 1 (2000) that has transferred the write command (S710).

Upon receipt of the write command completion response to the physical storage apparatus 2 (2000), the physical storage apparatus 1 (2000) releases the exclusive lock (S611) and returns a write command completion response to the host computer 1000 (S612).

In FIG. 31, the physical storage apparatus 2 (2000) receives a write command to a physical VOL 2 (virtual VOL 11) 2900 (S101). The physical storage apparatus 2 (2000) transfers the write command to the physical storage apparatus 1 (2000) (S603).

The physical storage apparatus 1 (2000) obtains an exclusive lock for the designated address area in the physical VOL 1 (2900) (S705) and writes the write data (S706). Subsequently, the physical storage apparatus 1 (2000) sends a write command completion response to the physical storage apparatus 2 (2000) (S710). The physical storage apparatus 2 (2000) obtains an exclusive lock for the designated address area in the physical VOL 2 (2900) (S605) and writes the write data (S606).

Next, the physical storage apparatus 2 (2000) transfers the write command to the physical storage apparatus 3 (2000) providing a physical VOL 3 (2900) (S610). The physical storage apparatus 3 (2000) writes the write data to the physical VOL 3 (2900) without obtaining an exclusive lock (S706). Subsequently, the physical storage apparatus 3 (2000) sends a write command completion response to the physical storage apparatus 2 (2000) (S710). Upon receipt of the write command completion response from the physical storage apparatus 3 (2000), the physical storage apparatus 2 (2000) releases the exclusive lock (S611) and returns a write command completion response to the host computer 1000 (S612).

Subsequently, the physical storage apparatus 2 (2000) sends an exclusive lock release command to the physical storage apparatus 1 (2000) (S615). The physical storage apparatus 1 (2000) receives the exclusive lock release command (S713) and releases the exclusive lock (S714). The physical storage apparatus 1 (2000) returns an exclusive lock release command completion response to the physical storage apparatus 2 (2000) (S718).

In FIG. 32, the physical storage apparatus 3 (2000) receives a write command to a physical VOL 3 (virtual VOL 11) 2900 (S101). The physical storage apparatus 3 (2000) transfers the write command to the physical storage apparatus 2 (2000) (S604). Upon receipt of the write command from the physical storage apparatus 3 (2000), the physical storage apparatus 2 (2000) transfers the write command to the physical storage apparatus 1 (2000) (S704).

The physical storage apparatus 1 (2000) obtains an exclusive lock for the designated address area in the physical VOL 1 (2900) (S705) and writes the write data (S706). Next, the physical storage apparatus 1 sends a write command completion response to the physical storage apparatus 2 (2000) (S710).

The physical storage apparatus 2 (2000) obtains an exclusive lock for the designated address area in the physical VOL 2 (2900) (S705) and writes the write data (S706). Subsequently, the physical storage apparatus 2 (2000) sends a write command completion response to the physical storage apparatus 3 (2000) (S712).

The physical storage apparatus 3 (2000) that has received the write command completion response from the physical storage apparatus 2 (2000) writes the write data to the designated area of the physical VOL 3 (2900) (S606) and returns a write command completion response to the host computer 1000 (S612).

Subsequently, the physical storage apparatus 3 (2000) sends an exclusive lock release command to the physical storage apparatus 2 (2000) (S617). The physical storage apparatus 2 (2000) receives the exclusive lock release command (S713) and then releases the exclusive lock (S714). Next, the physical storage apparatus 2 (2000) sends an exclusive lock release command to the physical storage apparatus 1 (2000) (S716).

The physical storage apparatus 1 (2000) receives the exclusive lock release command (S713) and releases the exclusive lock (S714). The physical storage apparatus 1 (2000) returns an exclusive lock release command completion response to the physical storage apparatus 2 (2000) (S718).

Upon receipt of the exclusive lock release completion response from the physical storage apparatus 1 (2000), the physical storage apparatus 2 (2000) returns an exclusive lock release command completion response to the physical storage apparatus 3 (2000) (S718).

This embodiment enables migration of a volume in an HA cascade configuration without stopping host I/Os while maintaining high availability. Since the read command processing during a volume migration is the same as that in Embodiment 1, description thereof is omitted.

Embodiment 3

Figure 33A:
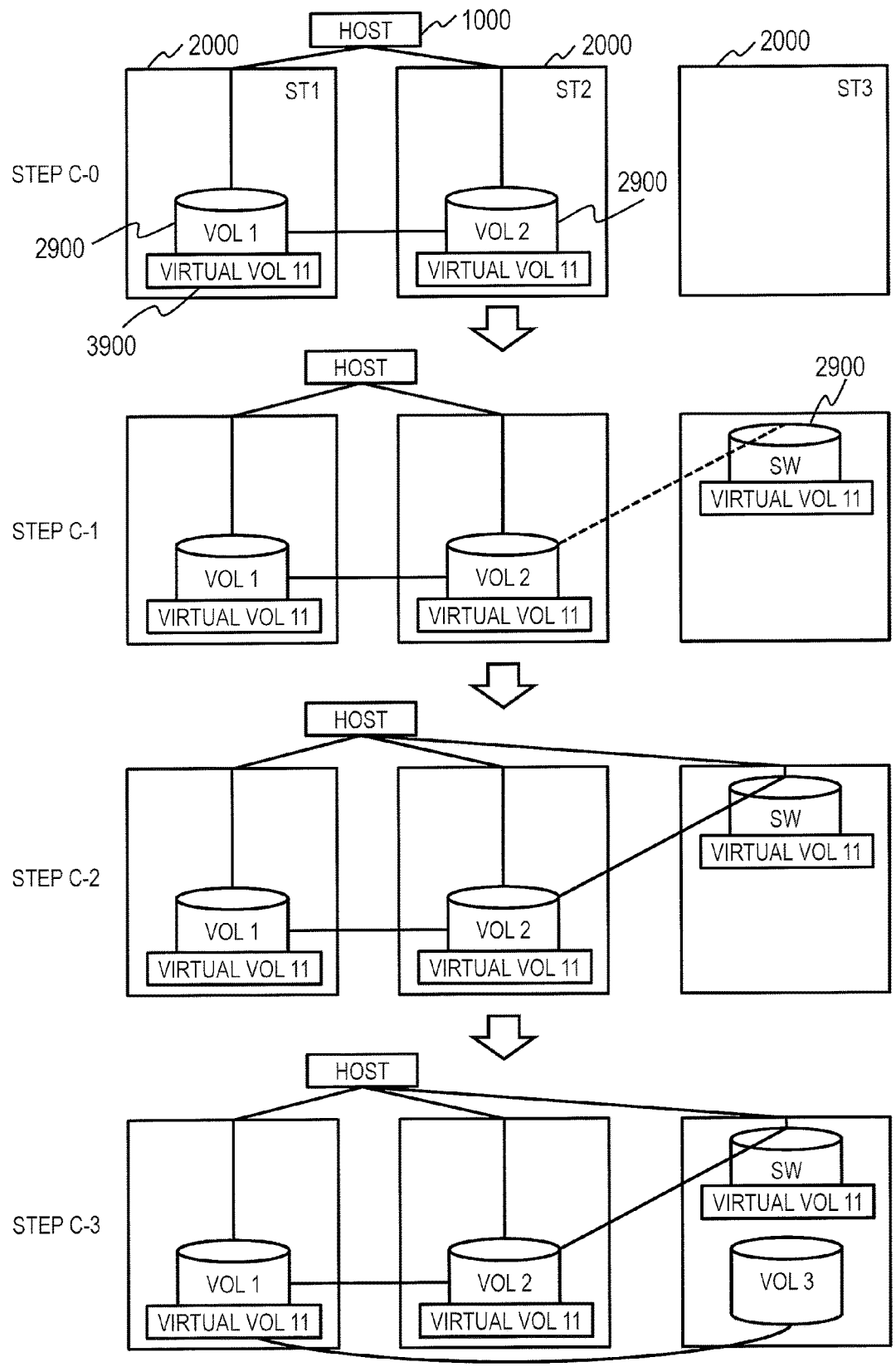
FIG. 33A is a diagram illustrating steps of migration of an HA volume pair in Embodiment 3.
Figure 33B:
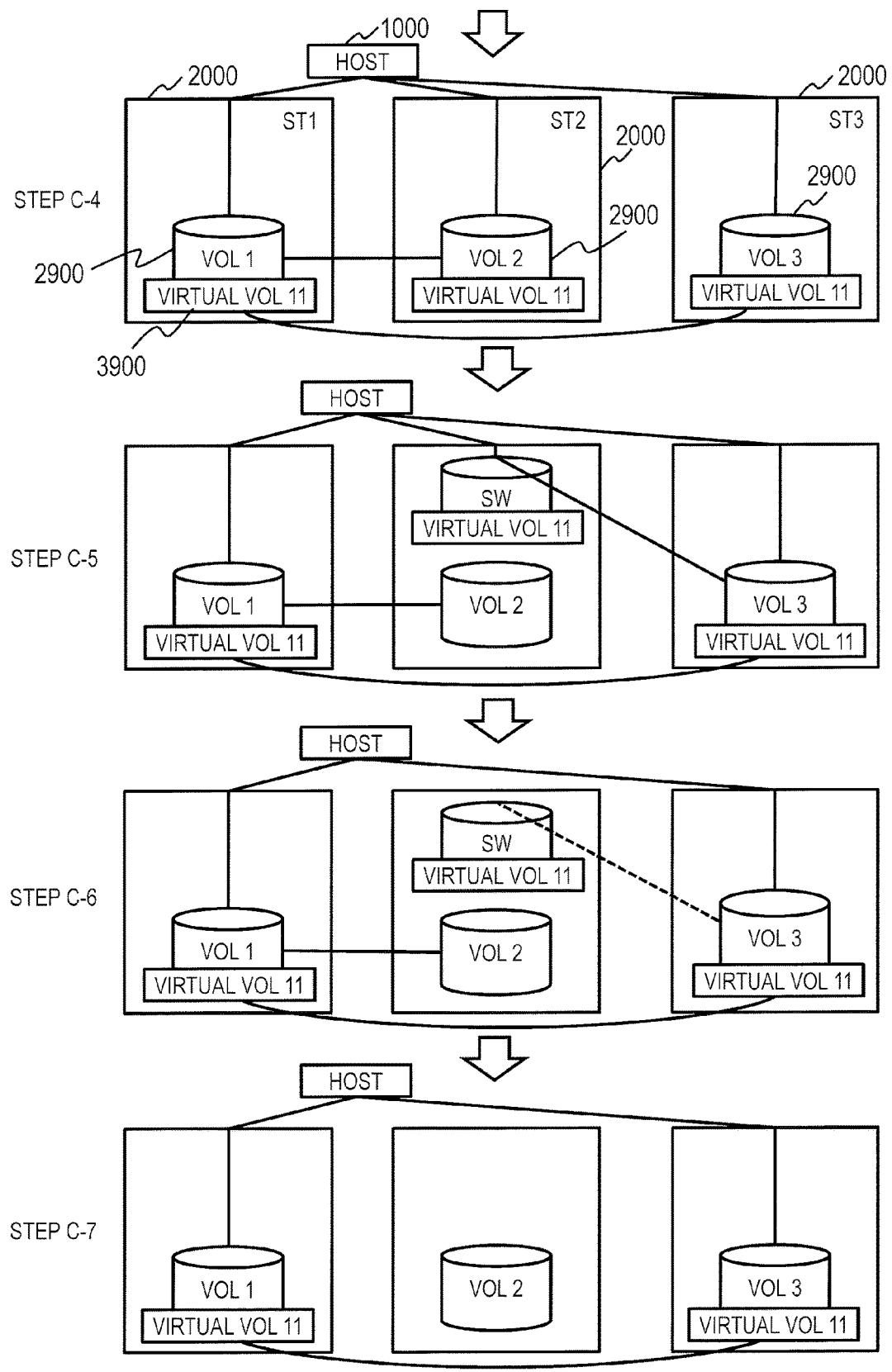
FIG. 33B is a diagram illustrating steps of migration of an HA volume pair in Embodiment 3.

Hereinafter, Embodiment 3 is described. This embodiment describes a volume migration using an I/O switching volume in an HA multi-target configuration. FIGS. 33A and 33B illustrate steps of migration of an SVOL (physical VOL 2) in the physical storage apparatus 2 (ST2) of an HA pair to the physical storage apparatus 3 (ST3). The post-migration physical volume is a physical VOL 3. In this embodiment, the system administrator executes these steps. In FIGS. 33A and 33B, the reference signs are partially omitted.

Step C-0 indicates the initial state of Steps C. Paths are defined between the host computer 1000 and the physical VOL 1 and between the host computer 1000 and the physical VOL 2. The physical VOLs 1 and 2 constitute a volume pair. The physical VOLs 1 and 2 are constituents of a virtual VOL 11; the host computer 1000 can access either one of the physical VOLs 1 and 2 to access the virtual VOL 11.

At Step C-1, the physical storage apparatus 3 creates an I/O switching volume (SW VOL) (2900) associated with the physical VOL 2 in accordance with an instruction of the system administrator. I/O requests directed to the SW VOL from the host computer 1000 are transferred to the physical volume associated with the SW VOL. The physical storage apparatus 3 assigns a virtual ID to the SW VOL in accordance with an instruction from the system administrator.

Processing an I/O request transferred from the SW VOL to the physical volume associated with the SW VOL is the same as the processing an I/O request issued directly to the physical volume from the host computer except that the I/O request is sent via the SW VOL. In the example of Step C-3, the processing an I/O request sent from the host computer 1000 to SW VOL and transferred to the physical VOL 2 is the same as the processing an I/O request issued from the host computer 1000 to the physical VOL 2 except that the I/O request is sent via the SW VOL.

At Step C-2, the host computer 1000 and the physical storage apparatus 3 define a path from the host computer 1000 to the SW VOL in accordance with an instruction of the system administrator. At Step C-3, the physical storage apparatuses 1 and 3 create an HA pair of the VOL 1 and VOL 3 in accordance with an instruction of the system administrator.

At Step C-4, the physical storage apparatus 3 assigns a virtual ID to the physical VOL 3 in accordance with an instruction from the system administrator.

Further, the host computer 1000 and the physical storage apparatus 3 define a path from the host computer 1000 to the physical VOL 3 and delete the SW VOL.

At Step C-5, the physical storage apparatus 2 creates an SW VOL associated with the physical VOL 3 and assigns a virtual ID to the created SW VOL in accordance with an instruction from the system administrator. The host computer 1000 and the physical storage apparatus 3 define a path from the host computer 1000 to the SW VOL, delete the path from the host computer 1000 to the physical VOL 2, and delete the virtual ID of the virtual VOL 2.

At Step C-6, the host computer 1000 and the physical storage apparatus 2 delete the path from the host computer 1000 to the SW VOL in accordance with an instruction from the system administrator. At Step C-7, the physical storage apparatus 2 deletes the SW VOL and the physical storage apparatuses 1 and 2 delete the HA pair of the physical VOLs 1 and 2 in accordance with an instruction from the system administrator.

This embodiment uses an I/O switching volume to enable a storage apparatus to independently manage physical volumes and paths between the physical storage apparatus and the host computer. It is preferable to prepare I/O switching volumes for both of the post-migration physical volume to be newly created and the pre-migration physical volume to be deleted after the migration; however, the embodiment may prepare only one of the switching volumes.

Embodiment 4

Figure 34A:
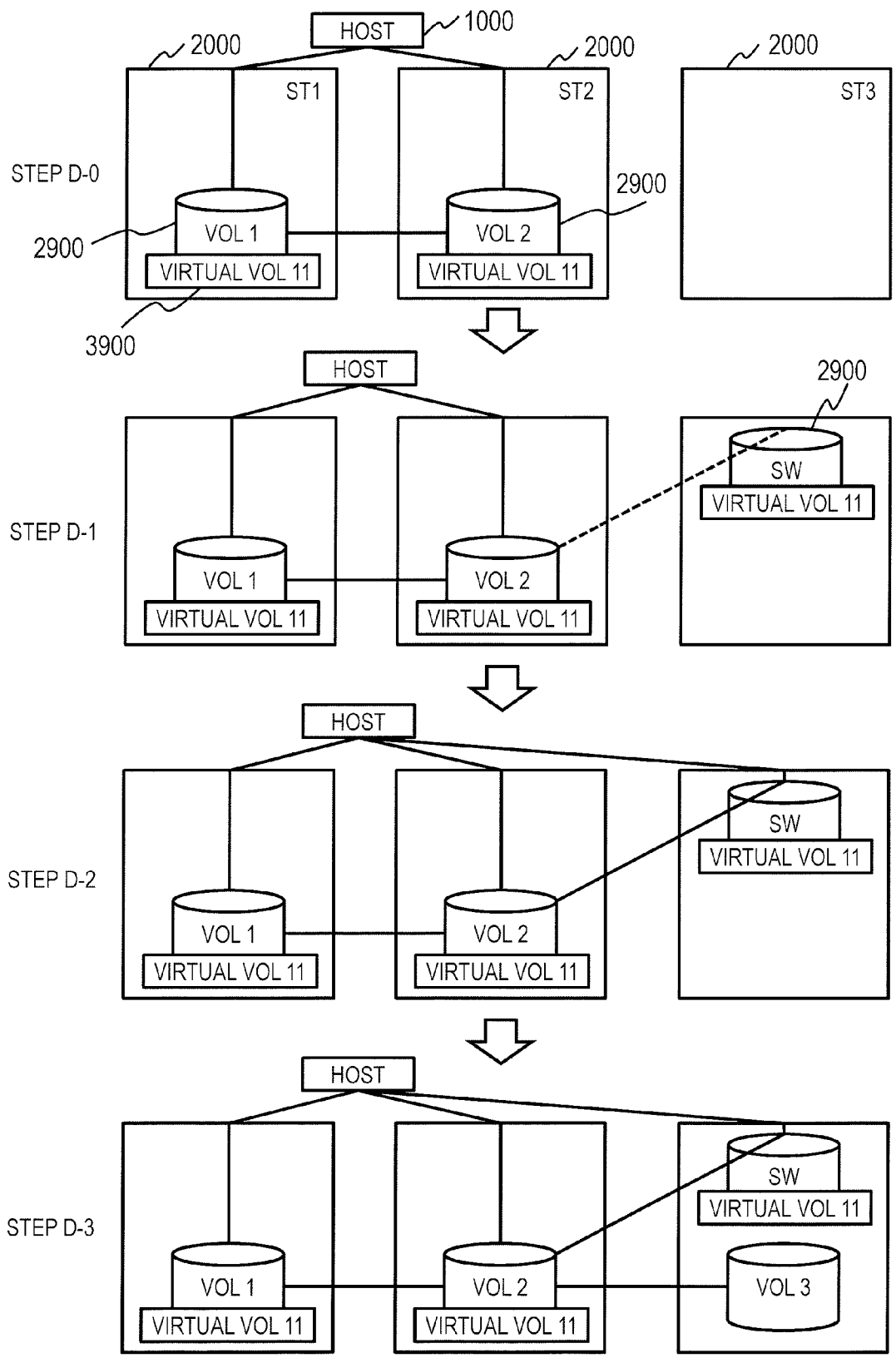
FIG. 34A is a diagram illustrating steps of migration of an HA volume pair in Embodiment 4.
Figure 34B:
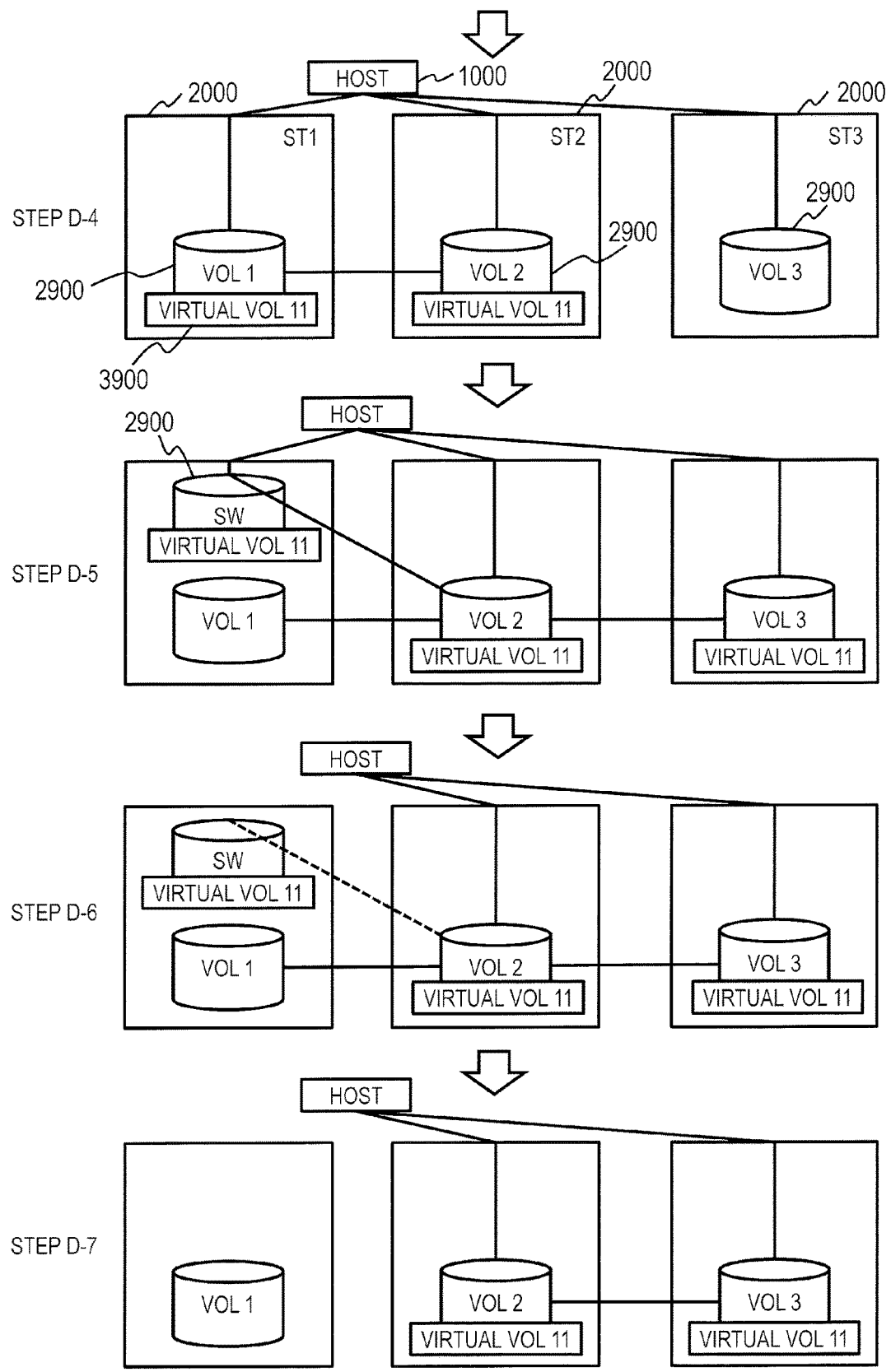
FIG. 34B is a diagram illustrating steps of migration of an HA volume pair in Embodiment 4.

Hereinafter, Embodiment 4 is described. This embodiment describes a volume migration using an I/O switching volume in an HA cascade configuration. The differences from Embodiment 3 are mainly described. FIGS. 34A and 34B illustrate steps of migration of a PVOL (physical VOL 1) in the physical storage apparatus 1 (ST1) of an HA pair to the physical storage apparatus 3 (ST3). The post-migration physical volume is a physical VOL 3. In this embodiment, the system administrator executes these steps. In FIGS. 34A and 34B, the reference signs are partially omitted.

Step D-0 indicates the initial state of Steps D. Paths are defined between the host computer 1000 and the physical VOL 1 and between the host computer 1000 and the physical VOL 2. The physical VOLs 1 and 2 constitute a volume pair.

At Step D-1, the physical storage apparatus 3 creates a SW VOL associated with the physical VOL 2 and assigns a virtual ID to the SW VOL in accordance with an instruction of the system administrator.

At Step D-2, the host computer 1000 and the physical storage apparatus 3 define a path from the host computer 1000 to the SW VOL in accordance with an instruction of the system administrator. At Step D-3, the physical storage apparatus 3 creates a physical VOL 3 and the physical storage apparatuses 2 and 3 create an HA pair of the VOL 2 and VOL 3 in accordance with an instruction of the system administrator.

At Step D-4, the physical storage apparatus 3 assigns a virtual ID to the physical VOL 3 in accordance with an instruction from the system administrator. Further, the host computer 1000 and the physical storage apparatus 3 define a path from the host computer 1000 to the physical VOL 3. The physical storage apparatus 3 deletes the SW VOL.

At Step D-5, the physical storage apparatus 1 (ST1) creates an SW VOL associated with the physical VOL 2 and assigns a virtual ID to the created SW VOL in accordance with an instruction from the system administrator. The host computer 1000 and the physical storage apparatus 1 define a path from the host computer 1000 to the SW VOL, delete the path from the host computer 1000 to the physical VOL 1, and delete the virtual ID of the virtual VOL 1.

At Step D-6, the host computer 1000 and the physical storage apparatus 1 delete the path from the host computer 1000 to the SW VOL in accordance with an instruction from the system administrator. At Step D-7, the physical storage apparatus 1 deletes the SW VOL and the physical storage apparatuses 1 and 2 delete the HA pair of the physical VOLs 1 and 2 in accordance with an instruction from the system administrator.

This embodiment uses an I/O switching volume to enable a storage apparatus to independently manage physical volumes and paths between the physical storage apparatus and the host computer. It is preferable to prepare I/O switching volumes for both of the post-migration physical volume to be created and the pre-migration physical volume to be deleted after migration; however, the embodiment may prepare only one of the switching volumes.

Embodiment 5

Figure 35:
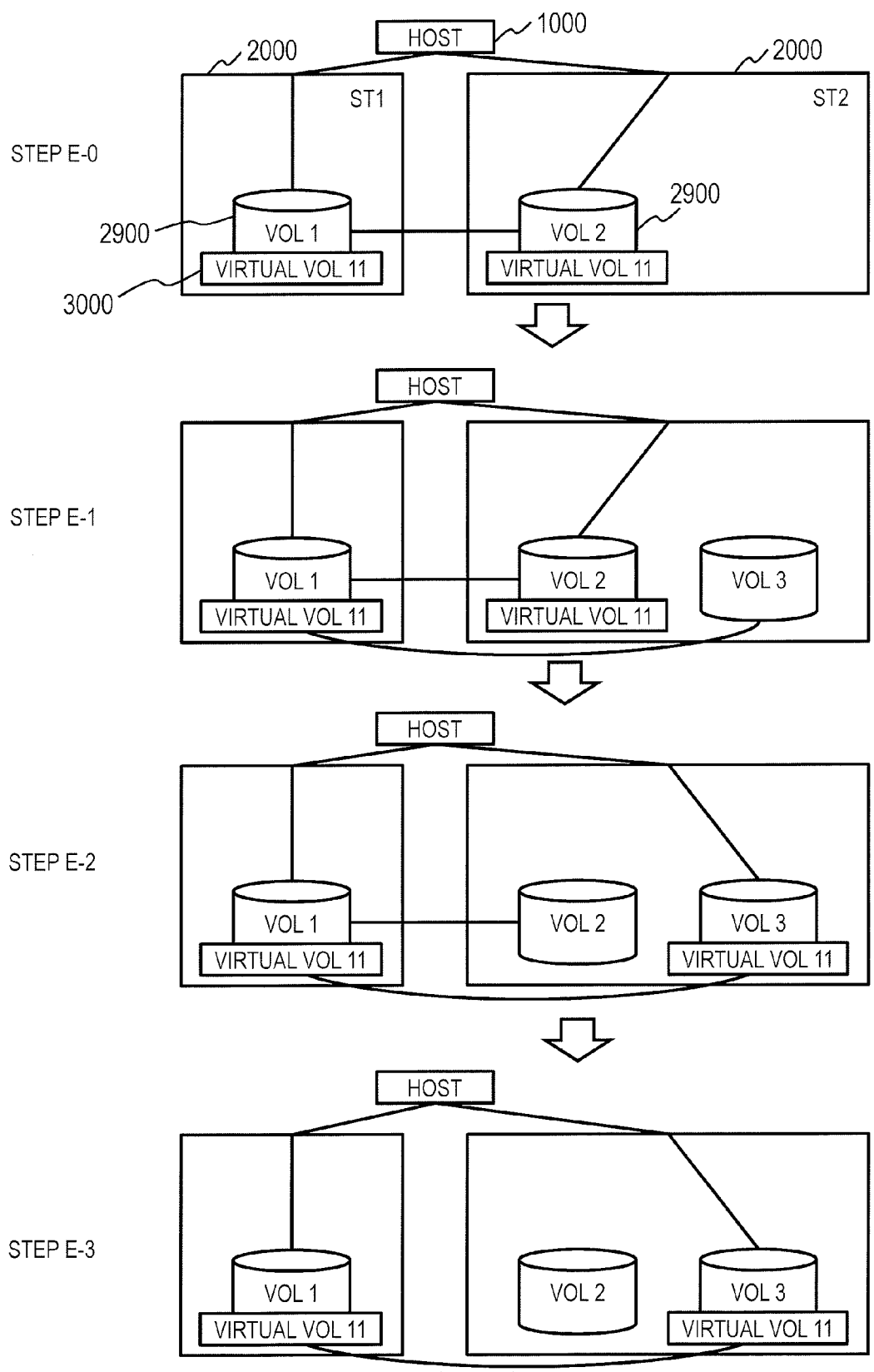
FIG. 35 is a diagram illustrating steps of migration of an HA volume pair in Embodiment 5.

Hereinafter, Embodiment 5 is described. FIG. 35 illustrates steps of replacing an SVOL (VOL 2) in the physical storage apparatus 2 (ST2) of an HA pair with another volume (VOL 3) in the same the physical storage apparatus 2. In this embodiment, the system administrator executes these steps. In FIG. 35, the reference signs are partially omitted.

Step E-0 indicates the initial state of Steps E. Paths are defined between the host computer 1000 and the physical VOL 1 and between the host computer 1000 and the physical VOL 2. The physical VOLs 1 and 2 constitute a volume pair. At Step E-1, the physical storage apparatus 2 creates a physical VOL 3 and creates an HA pair of the physical VOL 1 and the physical VOL 3 in accordance with an instruction of the system administrator.

At Step E-2, the physical storage apparatus 2 assigns a virtual ID to the physical VOL 3 in accordance with an instruction from the system administrator. Further, the host computer 1000 and the physical storage apparatus 2 define a path from the host computer 1000 to the physical VOL 3, delete the path from the host computer 1000 to the physical VOL 2, and delete the virtual ID of the physical VOL 2. At Step E-3, the physical storage apparatuses 1 and 2 delete the HA pair of the physical VOLs 1 and 2.

This embodiment performs migration of a volume of an Active-Active HA volume pair within the same physical storage apparatus; during the migration, no host I/O is interrupted and the high availability is maintained.

This invention is not limited to the above-described embodiment but includes various modifications. The above-described embodiments are explained in detail for better understanding of this invention and are not limited to those including all the configurations and elements described above. A part of the configuration of an embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A storage system comprising a plurality of storage apparatuses that perform a migration from a pre-migration volume group to a post-migration volume group,
wherein the plurality of storage apparatuses are configured to accept a write command directed to any one of a plurality of volumes included in the pre-migration volume group and the post-migration volume group from a host when the migration is being processed,
wherein the plurality of storage apparatuses are configured to write write data of the write command to all of the plurality of volumes in a predetermined sequential order,
wherein a first storage apparatus in the plurality of storage apparatuses is configured to write the write data to a last volume last among the plurality of volumes, and
wherein storage apparatuses in the plurality of storage apparatuses providing volumes different from the last volume are configured to write the write data to the different volumes after individually obtaining exclusive locks and release the exclusive locks after completion of the writing the write data to the last volume.

2. The storage system according to claim 1,
wherein the pre-migration volume group is composed of a first volume and a second volume,
wherein the post-migration volume group is composed of the first volume and a third volume,
wherein the plurality of storage apparatuses are configured to copy data of the first volume to the third volume,
wherein the second volume or the third volume is the last volume,
wherein the plurality of storage apparatuses are configured to write the write data to the first volume first among the first volume, the second volume, and the third volume,
wherein a storage apparatus providing the second volume is configured to receive the write data and a write command to write the write data from a storage apparatus providing the first volume, and
wherein a storage apparatus providing the third volume is configured to receive the write data and a write command to write the write data from the storage apparatus providing the first volume.

3. The storage system according to claim 2,
wherein the storage apparatus providing the second volume is configured to transfer the write command and the write data to the storage apparatus providing the first volume upon receipt of the write command and the write data from the host, and
wherein the storage apparatus providing the third volume is configured to transfer the write command and the write data to the storage apparatus providing the first volume upon receipt of the write command and the write data from the host.

4. The storage system according to claim 1,
wherein the pre-migration volume group is composed of a first volume and a second volume,
wherein the post-migration volume group is composed of the first volume and a third volume,
wherein the plurality of storage apparatuses are configured to copy data of the second volume to the third volume,
wherein the plurality of storage apparatus are configured to write the write data to the first volume, the second volume, and the third volume in this order,
wherein a storage apparatus providing the second volume is configured to receive the write data and a write command to write the write data from a storage apparatus providing the first volume, and
wherein a storage apparatus providing the third volume s configured to receive the write data and a write command to write the write data from the storage apparatus providing the second volume.

5. The storage system according to claim 4,
wherein the storage apparatus providing the second volume is configured to transfer the write command and the write data to the storage apparatus providing the first volume upon receipt of the write command and the write data from the host, and
wherein the storage apparatus providing the third volume is configured to transfer the write command and the write data to the storage apparatus providing the second volume upon receipt of the write command and the write data from the host, and
wherein the storage apparatus providing the second volume is configured to transfer the write command and the write data received from the storage apparatus providing the third volume to the storage apparatus providing the first volume.

6. The storage system according to claim 1,
wherein, in response to a read command directed to a designated volume among the different volumes, the plurality of storage apparatuses are configured to retrieve read data from the designated volume after obtaining an exclusive lock for the designated volume and release the exclusive lock after the retrieving the read data.

7. The storage system according to claim 1,
wherein the plurality of storage apparatuses are configured to create an I/O switching volume for a new volume to be created in the post-migration volume group,
wherein, when the migration is being processed, the plurality of storage apparatuses are configured to transfer a write command directed to the I/O switching volume to a volume in the pre-migration volume group, and
wherein the plurality of storage apparatuses are configured to delete the I/O switching volume and define a path to the new volume after copying data from the pre-migration volume group to the new volume.

8. The storage system according to claim 1,
wherein the plurality of storage apparatuses are configured to create an I/O switching volume for a volume belonging to the pre-migration volume group and not belonging to the post-migration volume group,
wherein, when the migration is being processed, the plurality of storage apparatuses are configured to transfer a write command directed to the I/O switching volume to a volume in the post-migration volume group, and
wherein the plurality of storage apparatuses are configured to delete the I/O switching volume after completion of the migration.

9. A control method for a plurality of storage apparatuses that perform a migration from a pre-migration volume group to a post-migration volume group, the plurality of storage apparatuses configured to accept a write command directed to any one of a plurality of volumes in the pre-migration volume group and the post-migration volume group when the migration is being processed, the control method comprising:
writing write data of the write command to all of the plurality of volumes in a predetermined order;
writing the write data to a last volume last among the plurality of volumes, and
writing the write data to volumes different from the last volume after individually obtaining exclusive locks and, after completion of the writing the write data to the last volume, releasing the exclusive locks.

* * * * *